(12) United States Patent
Merino et al.

(10) Patent No.: US 10,225,709 B2
(45) Date of Patent: Mar. 5, 2019

(54) SYSTEM AND METHOD FOR A GLOBAL WIRELESS INDIRECT INTERNET CONNECT SYSTEM

(71) Applicant: FRINWO S.L., Malaga (ES)

(72) Inventors: Jose Merino, Kortessem (BE); Michael Camilleri, Vancouver (CA); Simon Wilkinson, Prestbury (GB)

(73) Assignee: SID LIMITED, Gibraltar (GI)

( * ) Notice: Subject to any disclaimer, the term of this patent is extended or adjusted under 35 U.S.C. 154(b) by 0 days.

(21) Appl. No.: 15/548,351

(22) PCT Filed: Feb. 3, 2016

(86) PCT No.: PCT/GB2016/050241
§ 371 (c)(1),
(2) Date: Aug. 2, 2017

(87) PCT Pub. No.: WO2016/124915
PCT Pub. Date: Aug. 11, 2016

(65) Prior Publication Data
US 2018/0027353 A1     Jan. 25, 2018

(30) Foreign Application Priority Data

Feb. 3, 2015    (GB) .................................. 1501723.9

(51) Int. Cl.
*H04W 4/00*     (2018.01)
*H04W 4/50*     (2018.01)
(Continued)

(52) U.S. Cl.
CPC ............. *H04W 4/50* (2018.02); *H04W 88/04* (2013.01); *H04W 4/80* (2018.02); *H04W 12/06* (2013.01); *H04W 36/04* (2013.01)

(58) Field of Classification Search
CPC . H04W 4/001; H04W 64/003; H04W 64/006; H04W 4/00
(Continued)

(56) References Cited

U.S. PATENT DOCUMENTS 8,644,255 B1    2/2014  Burcham et al.
9,860,868 B2 *  1/2018  Smith .................... H04W 4/029
(Continued)

OTHER PUBLICATIONS

Lefuente et al., "Achieving Collaborative Wi-Fi Sharing withcsut Changing Current Techncioges," 2013 12th IEEE Intl. Conference on Trust, Security and Privacy in Computing and Communications, pp. 1510-1515 (Jul. 1, 2013) XP 055156576.
(Continued)

*Primary Examiner* — William D Cumming
(74) *Attorney, Agent, or Firm* — Saul Ewing Arnstein & Lehr LLP

(57) ABSTRACT

A system and method of enabling a wireless device that has no directly accessible wireless Internet connection at a given location to make a data connection through a neighboring different wireless device that does have directly accessible wireless Internet connection, to connect to the Internet. Specifically such indirect Internet connection does not require any authorization from any such other device, such as a server, other than between both wireless devices and additionally the wireless device that has no directly accessible wireless Internet connection does not require any credits from the wireless network to which the wireless device that does have directly accessible wireless Internet connection is connected to.

20 Claims, 8 Drawing Sheets

(51) Int. Cl.
*H04W 88/04* (2009.01)
*H04W 4/80* (2018.01)
*H04W 12/06* (2009.01)
*H04W 36/04* (2009.01)

(58) Field of Classification Search
USPC ........................................................ 455/436
See application file for complete search history.

(56) References Cited

U.S. PATENT DOCUMENTS

| | | | |
|---|---|---|---|
| 9,866,392 B1 * | 1/2018 | Campagna | H04L 9/3247 |
| 9,871,723 B2 * | 1/2018 | Teyeb | H04L 45/24 |
| 9,877,299 B2 * | 1/2018 | Smith | H04W 4/029 |
| 2018/0014241 A1 * | 1/2018 | Perdomo | H04W 40/12 |
| 2018/0027353 A1 * | 1/2018 | Merino | H04W 4/50 |
| | | | 455/436 |

OTHER PUBLICATIONS

Hao et al., "Design, Realization, and Evaluation of DozyAP for Power-Efficient Wi-Fi Tethering," IEEE/ACM Transactions on Networking, vol. 22, No. 5, pp. 1672-1685 (Oct. 1, 2014) XP011561608.
Iosifidis et al., "Enabling crowd-sourced mobiie Internet access," IEEE Infocom 2014—IEEE Conference on Computer Communications, pp. 451-459 (Apr. 27, 2014) XP 032616531.
Sharma et al., "Cool-Tether," Proc 5th Intl. Conf. on Emerging Networking Experiments and Technologies, Conext '09, pp. 109 (Jan. 1, 2009) XP 055178196.
International Search Report, dated Apr. 8, 2016, issued in International Application No. PCT/GB2016/050241.

* cited by examiner

SYSTEM AND METHOD FOR A GLOBAL WIRELESS INDIRECT INTERNET CONNECT SYSTEM

CROSS REFERENCE TO RELATED APPLICATIONS

This application claims the priority of PCT/GB2016/050241, filed on Feb. 3, 2016, which claims the benefit of priority to Great Britain Application No. GB 1501723.9, filed on Feb. 3, 2015, the entire contents of which are fully incorporated herein by reference.

FIELD OF THE INVENTION

A system and method of operating a communications system to extend the Internet access globally to all wireless devices adapted as per this invention. Aspects of the disclosures relate in particular to a system and method of enabling a wireless device adapted as per this invention that has no directly accessible wireless Internet connection at a given location to make a data connection through a neighbouring different wireless device adapted as per this invention that does have directly accessible wireless Internet connection, to connect to the Internet. Specifically such indirect internet connection of this invention not requiring any authorization form any such other device, such as a server, other then between both wireless devices adapted as per this invention and additionally the wireless device adapted as per this invention that has no directly accessible wireless Internet connection does not requiring any credits from the wireless network to which the wireless device adapted as per this invention that does have directly accessible wireless Internet connection is connected to.

BACKGROUND OF THE INVENTION

Wireless devices have evolved to become smart devices or also called smartphones or tablet and can now handle voice and data directly or though downloaded software Apps. Such wireless devices (smartphones and tablets) have typically multiple hardware radio allowing the wireless device to connect to the Internet over different wireless networks, such as through mobile networks (WCDMA, PCS, GSM, GPRS, 2G, 3G, 4G, LTE, etc.), through WiFi (wireless fidelity) as known by end-users or as referred to by the technically skilled as Wi-Fi (wireless fidelity) and through short-range wireless interconnection, e.g., BLUETOOTH. In some wireless devices, such as some lower end tablets, where the only hardware radio connection available to connect to the Internet is only through Wi-Fi or through BLUETOOTH.

In more recent times wireless devices (smartphones and tablets) also have a so called "personal hotspot" feature which then converts the wireless device that shares connection to the mobile network Internet through its Wi-Fi or BLUETOOTH radio with other wireless devices that are allowed to connect to it.

The latest wireless devices variant of previous mentioned smartphones or tablet with a "personal hotspot" feature have resulted in several manufacturers to release so called MiFi-devices, which are wireless devices that have only function, namely to act always as a "personal hotspot". These MiFi devices typically allow 5 or more different wireless devices to connect to the MiFi device through Wi-Fi and then to the Internet through the MiFi Internet connection to a mobile network, typically requiring a valid SIM (subscriber identity module) in the MiFi device.

Any such wireless device that connects to a mobile network to the Internet requires a valid subscription and depending on the mobile network operator also require a valid SIM.

All wireless devices with a valid SIM connect to the HLR of the mobile network operator when in the coverage area serviced by their home mobile network operator but connects to a VLR when in the coverage area not serviced by their home mobile network operator, this last typically when roaming.

Competition driven mainly by innovations and often protected by patents which are licensed to third parties rather than by regulation have driven mobile network operators to provide to their users bundles with unlimited calls and text messages and a reasonable amount of megabytes of data to connect to the Internet in the same bundle within the area(s) where the mobile network operator provides radio coverage service to its users. Some mobile network operators provide also data only bundles for use in the coverage area (country) where it provides radio coverage to its users yet still high data usage prices when roaming abroad or when users connects to the Internet through a mobile network operator servicing such coverage area not serviced directly by the home mobile network operator of the SIM of the end user.

Mobile network operators and mobile virtual network operators make their profit typically on user breakage when providing bundle pricing for in-country unlimited calls, text including a reasonable amount of data (500 MB, 1 GB, 5 GB, etc. where MB is megabyte and GB is gigabyte) to connect to the Internet or a data only bundle to connect to the Internet. Breakage means that the end-user in order not to pay extra much higher prices per MB over and above his data bundle(s) allowance.

In the past years the amount of data allowance per bundle has been increasing consistently and is expected to increase in the future, for example where for a given bundle cost the amount of data allowance per month was a 2 years ago 500 Mb, it increased for the same cost to around 1 GB a year ago and is currently close to becoming for the same cost a monthly data allowance of 3 GB. In practice although mobile data usage by end-users has increased it has not increased in the same amount that mobile network operators are increasing the monthly data allowance year on year for the same price year on year user get a lot more data allowance. Typically an wireless device (smartphone and tablet) end-user uses quite a lot less then the maximum data amount allowance of that month and that unused monthly data is what is known as breakage is likely to increase in the future.

The biggest breakage is achieved by mobile network operators when a wireless device user is roaming or in a different country connected to a different mobile network operator because the data bundle allowance in roaming is very small or in most cases only applies to data usage for connecting to the Internet only on his home country when connected to the end-user's wireless device SIM home country connected to its home mobile network operator.

When looking at the prior art, current wireless devices (smartphones and tablets) with the "personal hotspot" features and a valid SIM or "MiFi" devices with a valid SIM, do not resolve the high Internet data cost to end-users when roaming or the high data cost over and above the data bundle allowance. The prior art does also not allow end-users access to the Internet when such end-user with a wireless device has no SIM credit (typically when prepay) or with a valid SIM but without any further mobile data allowance to allow such wireless device end-user to continue using the Internet without requiring to top up his mobile network operator SIM credit nor without requiring an additional MiFi device with an additional SIM with valid credit for data allowance.

Attempts have been made by companies such as Apple, Samsung, Huawei, and many other smartphones and tablets manufacturers providing embedded in their wireless hardware devices previous mentioned feature called "personal hotspot" as a software setting such that the wireless device becomes a "hotspot" performing the same function as a "MiFi" device. The end-user can activate or deactivate such "personal hotspot" function whereby the wireless device automatically disconnects itself from any data connection to a Wi-Fi or short-range wireless interconnection such as a BLUETOOTH network and establishes instead a data connection to the mobile network operator associated with the valid SIM inside the wireless device. Then the wireless device with the "personal hotspot" function activated allows other different to the previous authorised different wireless devices with a Wi-Fi or BLUETOOTH radio to connect to the Internet through Wi-Fi or BLUETOOTH of the wireless device with the "personal hotspot" function activated.

Companies such as Huawei, Alcatel and many other MiFi manufacturers provide a wireless device that is cheaper than a typical smartphone or tablet where the only function is to provide a permanent "personal hotspot" and such devices are commonly known as MiFi devices. Such MiFi devices do not require the end-user to activate or deactivate the "personal hotspot" as it's the only permanent function the MiFi device is designed to provide subject to having a valid SIM in the MiFi device. The fact that such MiFi device requires a valid SIM means in most if not all cases that end-users require at least two devices, their most commonly used smartphone or tablet plus an extra device such as the MiFi device. The shortcomings of the prior art when using a MiFi device are the same as when using a wireless device, because both require a valid SIM and thus both do not resolve the main issues listed previously, of using excess monthly data bundle allowance nor having access to the Internet when no data credit on the SIM of the MiFi nor the credit on the SIM of the smartphone or tablet.

Moreover certain tablet models from Apple, Samsung and other manufacturers do not have a SIM and thus such users with such tablet without a wireless device or MiFi with a valid SIM or a SIM without data credit cannot connect to the Internet when not at his home or office Wi-Fi or has to find a public free hotspot.

Probably one of the most successful attempts to address partially the shortcomings of the prior art was by Mr Martin Varsaysky, who according the website at the URL en.wikipedia.org/wiki/Martin_Varsaysky, extraction of 20 Jan. 2015 "launched the company FON in Madrid at the end of 2005, which provides Wi-Fi services using user-generated infrastructure. Fon is backed by investors GOOGLE, SKYPE, Index Ventures and SEQUOIA CAPITAL. In 2012, the network reached over 7 million hotspots in several countries."

As extracted on 20 Jan. 2015 from the FON official website at the URL corp.fon.com/en, "Fon is your Global Wi-Fi Network. It's built by people just like you. Fon members share a bit of their home Wi-Fi, and in turn get free access at millions of other Fon hotspots worldwide. Joining is easy. All you have to do is buy a Fon Wi-Fi router and plug it into your broadband connection. No monthly fee! Or, if you live in a country where Fon has a Telco partner, just sign up with them to become a member." "Your global Wi-Fi Network. Join Fon and get free access to 14,136,008 Fon spots. Share a little Wi-Fi and roam the world for free."

Although the prior art by FON has grown to more than 14 million Wi-Fi hot-spots worldwide, it must be noted that such hotspots are fixed Wi-Fi hotspots mostly provided by private homes or small business through individuals or business having to purchase a Wi-Fi router hardware device connected to their fixed line Internet (ADSL, DSL fibre, etc.). In areas of high user concentration such as cities where high-rise apartments are common such Wi-Fi routers coverage provided vertically is of little or no use to most end-users. Furthermore the penetration of mobile subscribers has outperformed by far the fixed line subscriptions and thus the coverage footprint by those FON subscribed Wi-Fi routers can only provide a very small radio coverage footprint with their Wi-Fi routers even if 100% of all fixed line users would purchase a Wi-Fi router and subscribe to Fon in comparison to the more than 7 Billion mobile subscriber devices that could provide Wi-Fi and/or BLUETOOTH radio coverage globally with a foot print multiple times bigger.

A further shortcoming of the FON system, apart from the fact that users who subscribe to Fon has to purchase an additional hardware device Wi-Fi router and have a fixed Internet connection, is the fact that the FON Wi-Fi routers have to be replaced in time whilst the current invention does not require any additional hardware to be purchased at all by user who wish to subscribe or share the benefits of this invention.

Also the fact that the FON hotspots are mostly indoors Wi-Fi routers connected to fixed line Internet in people's homes renders to coverage area for actual use by end-users very limited when comparing to the sheer amount of mobile smartphone users to find other smartphone users is the proximity is extremely high simply by the high amount of penetration of mobile subscriptions.

A feature of the FON system, that is a benefit as much as it is a shortcoming is the fact that the Fon system is strictly based on fixed Wi-Fi router devices located at people's homes and small offices mainly, which makes their geographical deployment extremely difficult to be where there are mostly needed, namely wherever a high concentration of Wi-Fi enabled wireless devices (such as smartphones and tablets) are at given times.

A more recent attempt to resolve some of the shortcomings of the previously explained prior art, was made by Burcham, et al. (Burcham) through U.S. Pat. No. 8,644,255 of February 2014 with the following patent identification: Assignee: Sprint Communications Company L.P. (overland Park, Kans.), Family ID: 50001705, application Ser. No. 13/070,607, Filed: Mar. 24, 2011, and any such References Cited by Burcham.

Burcham's prior art titled "Wireless device access to communication services through another wireless device" describes the patent novelty in his abstract as follows: Quote "A method of operating a communication system is disclosed which includes, in a wireless communication device, transferring a wireless beacon signal and responsively receiving a wireless access request from a user device, determining if a user identifier received with the wireless access request has usage credits in a data structure, exchanging wireless signals with the user device and with a wireless communication network based on the usage credits to provide a wireless communication service to the user device, and decrementing the usage credits for the user identifier in the data structure. The method also includes wirelessly transferring usage credit updates for receipt in a master data structure." Unquote.

Burcham's prior art further describes the patent novelty in his Claim 1 as follows: "1. A method of operating a communication system, the method comprising: in a first user device, transferring a wireless beacon signal and responsively receiving a first wireless access request from a second user device indicating a user identifier, processing the user identifier in a first data structure to determine if the user identifier has usage credits, and if the user identifier has the usage credits, exchanging wireless signals, through the first user device, with the second user device and with a wireless communication network to provide a wireless communication service to the second user device, decrementing the usage credits in the first data structure for the user identifier, and wirelessly transferring first data structure updates; in a control server, receiving and processing the first data structure updates to update a master data structure; in a third user device, transferring the wireless beacon signal and responsively receiving a second wireless access request from the second user device indicating the user identifier, processing the user identifier in a second data structure to determine if the user identifier has the usage credits, and if the user identifier does not have the usage credits, transferring a usage request indicating the user identifier; in the control server, receiving and processing the usage request indicating the user identifier against the master data structure to generate and transfer an update message for the second data structure; in the third user device, receiving and processing the update message for the second data structure to update the second data structure, processing the user identifier against the second data structure to determine if the user identifier has the usage credits, and if the user identifier has the usage credits, exchanging the wireless signals, through the third user device, with the second user device and with the wireless communication network to provide the wireless communication service to the second user device, decrementing the usage credits in the second data structure for the user identifier, and wirelessly transferring second data structure updates."

The prior art by Burcham is particularly beneficial to Mobile network operators to increase the paid usage of their data networks to monetize on their infrastructure investments. Burcham refers to paid usage as "usage credit".

However Burcham does not resolve the shortcomings that this invention is specifically addressing to resolve, as described in the text and illustrated in drawings (figures) but specifically as protected novelty described in the Claims herein. As a matter of illustration, the following are a summary of the shortcomings that the prior by Burcham does not resolve. Burcham specifically has the following conditions or limitation explicitly required by "the method" and "the communication system";

two different user devices (first user device and a third user device) to connect another user device (second user device),
three different data structures (first-, second-, master data structure), and
a control server,
wireless communication network,
first user device and third user device are registered users with usage credit for the wireless communication network's services
second user device identifiers accessing wireless communication service must have usage credit to access wireless communication network through first and third user device.

Our invention resolves the shortcomings of Burcham, in that in our invention there is no such restriction of requiring 3 user devices for a data connection to one of them, in other words Burcham requires two different user devices (first user device and a third user device) to connect another user device (second user device), whereas our invention only requires any such two wireless devices referred to by Burcham as "user devices".

Also Burcham requires three different data structures and a control server for the connection set-up whereas our invention does not require any such data structure nor any such server to set-up a data connection. Actually in our invention a server is optional to support additional optional features but is not required for the data connection from user devices to the communication system.

Another mayor restriction or condition of Burcham is that it requires user devices that wish to make use if its invention (as per Burcham second user device) to have "usage credit", meaning to pay for the access to the services such as data or Internet access) of the wireless communication network to which the sharing user devices (as per Burcham first user device and third user device) are connected to. This last in itself is such a major restriction in that, although commercially beneficial to the owners of the wireless communications network such as Mobile network Operators, it limits the scope of the invention to a relatively fragmented and thus small market segment of the global 7.1 Billion mobile subscriber base simply because the huge amount of Mobile Networks Operators per country times the amount of countries. In the end the invention of Burcham does not benefit the global 7.1 Billion mobile subscribers because end users still have to pay in order to access the benefits of the invention of Burcham and thus why connect indirectly if there is no financial benefit or cost reduction to the end user. In the communications system of Burcham end users can just as well get a direct service contract or pre-pay contract directly with the wireless communication network.

In our invention there is no such requirement for any such wireless device end user to have any credit (referred to by Burcham as user device identifier usage credit) at all to make use of the benefits of our invention. In fact our invention relies on the basis that wireless device users that download our invention software module that has direct wireless data access to share Internet data connection with any other wireless device users that also downloaded our invention software module does not have direct wireless data access without such last needing any credit at all to connect to the Internet through the first device and without any interaction with any server for such Internet data connection.

Another different prior art, less successful in terms of the low amount of users compared to previous mentioned prior arts, extracted on 2 Feb. 2015 can be found on this Internet website at the URL opengarden.com where they mention: "5 Million users. Check out how we improve your connectivity". On a different page within previous website, namely on opengarden.com/apps it states: "Open garden is a wireless mesh networking application . . . .". At the URL opengarden.com/faq#faq-security-005 it states: "Since the Open Garden clients use VPN functionality to route traffic and it is not possible to run simultaneous VPNs on the operating systems we support, Open Garden cannot work when a VPN is running . . . .". VPN stands for Virtual Private Network. At the URL opengarden.com/faq#faq-start-002 it states:

"Assuming you already installed Open Garden on a nearby device, press "Connect" on one or both devices and wait. For the first time connection, Open Garden needs to learn about nearby devices and will do so using one of three methods: WLAN, when the devices are connected to the same Wi-Fi network; location services, when the devices are connected to separate networks; and BLUETOOTH, when one of the devices is without Internet access completely, in this situation you can manually pair devices with BLUETOOTH to force a connection over Open Garden . . . .".

The shortcomings of Open Garden are numerous, but the main shortcomings are:
  that the downloaded Open Garden software on a wireless device requires one or more nearby device users to manually click on the screen to force a connection the first time connection;
  that when a nearby device has no Internet access at all then again such wireless device user has to manually pair the 2 or more nearby devices with the downloaded Open Garden software;
  that Open Garden when downloaded into a wireless device requires such wireless device to route all shared data traffic through a VPN.

Our invention does not have any of the previous mentioned limitations of Open Garden in that the our invention as described herein;
  does not require any manual intervention of any of the wireless devices users with a downloaded software of this invention to allow Internet Access the first time;
  does not require any manual intervention of any of the wireless devices users with a downloaded software of this invention to allow Internet Access the first time;
  does not require any manual intervention to pair any of the wireless devices users with a downloaded software of this invention to allow Internet Access even if one of them has no direct Internet access at all;
  does not require the use of a VPN in order to allow wireless devices users with a downloaded software of this invention to access the Internet through nearby wireless devices with a downloaded software of this invention;
  does not have the restriction when one of the devices has no internet connection to use it the first time to be limited to connect to another device with internet through BLUETOOTH only, actually our invention is specifically targeted to wireless devices without internet connection and thus connect through wireless devices with internet connection through any available radio module by both wireless devices with a downloaded module of this invention.

Our invention resolves all the prior art shortcomings because the wireless devices with a build-in software module as per this invention, is not limited to only paying users nor limited to the wireless devices that use a VPNs nor is any user interaction required to enable access the Internet through a neighbouring wireless devices with a build-in software module as per this invention, but rather our novelty allows Internet access to function for all wireless devices with no direct internet access provided they download the software module herein. By the sheer amount of wireless devices in any given place around the world our invention provides the best additional Internet access coverage for end-users in areas with high concentration of people, wherever that may be. This last is particularly illustrated because end users carry their wireless devices with them, that combined with the fact that there are currently around 5 times more wireless devices then landlines, according to gsgtelco.com (see further in SUMMARY OF THE INVENTION more details) by at least a ratio of 5.4B mobiles in use to 1.1B landlines=4.9 times up to 7.1B mobiles accounts to 1.1B landlines=6.4 times.

The following is a brief explanation of some of the industry terms used, as background information.

A Virtual Private Network (VPN) according to Wikipedia's website at the URL en.wikipedia.org/wiki/Virtualprivate network: "A VPN extends a private network across a public network, such as the Internet . . . . A VPN is created by establishing a virtual point-to-point connection through the use of dedicated connections, virtual tunneling protocols, or traffic encryptions . . . . One major limitation of traditional VPNs is that they are point-to-point, and do not tend to support or connect broadcast domains . . . . To prevent disclosure of private information, VPNs typically allow only authenticated remote access and make use of encryption techniques . . . . Mobile VPNs are used in a setting where an endpoint of the VPN is not fixed to a single IP address, but instead roams across various networks such as data networks from cellular carriers or between multiple Wi-Fi access points . . . . Instead of logically tying the endpoint of the network tunnel to the physical IP address, each tunnel is bound to a permanently associated IP address at the device."

A Home Location Register (HLR) is a database that contains mobile subscriber information for all subscribers of a mobile network operator. It is owned and maintained by that mobile operator.

A Visitor Location Register (VLR) is a database of the roaming users authorized and connected to the mobile network, such VLR database also owned and maintained by a mobile operator. It contains temporary information about mobile subscribers that are currently located in a geographic area served by that mobile operator, but whose Home Location Register (HLR) is elsewhere from a different mobile network operator.

HLR subscriber information includes the International Mobile Subscriber Identity (IMSI), service subscription information, location information (the identity of the currently serving Visitor Location Register (VLR) to enable the routing of mobile-terminated calls), service restrictions and supplementary services information. The HLR also initiates transactions with VLRs to complete incoming calls and to update subscriber data.

The IMSI is a unique non-dialable number allocated to each mobile subscriber that identifies the subscriber and his or her operator subscription. The IMSI is stored in the Subscriber Identity Module (SIM). The IMSI is made up of three parts (1) the mobile country code (MCC) consisting of three digits, (2) the Mobile Network Code (MNC) consisting of two digits, and (3) the Mobile Subscriber Identity Number (MSIN) with up to 10 digits.

When a mobile subscriber roams away from his home location and into a remote location (typically to a different country), SS7 messages are used to obtain information about the subscriber from the HLR, and to create a temporary record for the subscriber in the VLR. There is usually one VLR per operator. The VLR automatically updates the HLR with the new location information, which it does using an SS7 Location Update Request Message. The Location Update Message is routed to the HLR through the SS7 network, based on the global title translation of the IMSI that is stored within the SCCP Called Party Address portion of the message. The HLR responds with a message that informs the VLR whether the subscriber should be provided service in the new location.

This last is critical to a mobile network operator's ability to restrict what end-users can do is the fact that operators control their own HLR, which can be thought of as the gateway into the mobile communications system, not only to make calls but also to connect to the Internet. Even 'virtual mobile network operators' (VMNOs) are in effect subservient to the mainstream network operators that manage the physical infrastructure because the VMNOs still need to access the HLRs or VLR of the traditional mobile network operators who have ownership of the actual radio interface to the wireless devices (smartphones and tablets) with a valid SIM.

BRIEF SUMMARY OF THE INVENTION

The present invention is designed to overcome the shortcomings of the prior art and to provide an automated way of resolving the shortcomings of the prior art specifically for Internet enabled wireless devices capable of downloading a software module from the Internet. Such software module when downloaded onto the Internet enabled wireless device renders the software module operable to communicate with other wireless devices with the same such software module downloaded on to such other wireless device and without requiring any server. The invention does not require any server authentication of an authorized user as a wireless device becomes an authorized wireless device user upon download of the software module of this invention onto his wireless device.

It's such proprietary software module when downloaded into an Internet enabled wireless devices together with all such other different wireless devices with a downloaded software module, that jointly form the WIRELESS INDIRECT INTERNET CONNECT SYSTEM (WINICS) or in other words a system and method that resolves the shortcomings of the prior art for interfacing and connecting an Internet enabled wireless device to the public Internet network or any such other wireless communications network when such device user has no credit or no direct access to such public Internet network or any such other wireless communications network AND without requiring any server interaction to allow wireless device user such Internet access.

According to the website at the URL www.gsgtelco.com/2014/05/13/more-mobile-subscriptions-than-tv-sets-pcs-landline-phones-cable-satellite-subscriptions-combined/ by Joey deVilla on May 13, 2014, "There are more mobile subscriptions than TV sets, PCs, landline phones and cable/satellite subscriptions combined". The website pictures a graph showing 7.1B mobile accounts, 5.4B mobiles in use, 4.5 unique mobile users, 1.1B landlines. It states further, "The number of mobile subscriptions worldwide is now about the same as the number of people worldwide. According to mobile analyst and pundit Tomi Ahonen, the worldwide mobile subscriptions rate is 100%, and as an article of ours from last week pointed out, that the rate is even higher in the Americas, Arab states, and Europe, and it's highest in the CIS (former Soviet republics), where there are 141 subscriptions for every 100 people."

When considering the previous published figures and assuming that wireless/mobile saturation will only extend to more regions globally, then it becomes evident that more and more wireless devices users will encounter the same issues that the prior art is not resolving.

The present invention will resolve the following shortcomings of the prior art, namely to allow Internet enabled wireless device users to connect to the Internet:

without the need for the end-user to have an additional wireless hardware device, such as for example a MiFi device with a valid SIM to connect wirelessly to the Internet when the end-user is not in the coverage area of his home Wi-Fi, office Wi-Fi or a public hotspot Wi-Fi when the end-user own Internet enabled wireless device has run out of data bundle allowance or has no data credit to access the Internet through his own mobile network operator or Wi-Fi service provider when roaming without using his own Internet enabled wireless device roaming data even if the end-user has data credit without the need for the end-user of an Internet enabled wireless to have to ask to all the people around him if there is anybody with a MiFi or a smartphone or tablet to ask if they would be willing to share their MiFi password or to set manually their tablet or smartphone in "portable hotspot" mode and share the corresponding hotspot password.

The shortcomings of the prior art have been addressed by the present invention and resolved by the novelty of the combination of a proprietary software module that becomes operable when downloaded into an Internet enabled wireless device (smartphone or tablet) all those software modules, operable when downloaded into a wireless device, jointly and optional with a server with a build-in proprietary software module resolve the prior art short comings.

This is how the system (WINICS), and method, for interfacing and connecting an Internet enabled wireless device to the public Internet network functions as one embodiment of the present invention.

A user of an Internet enabled wireless device, such as a smartphone or tablet, downloads a proprietary software module of this invention onto his Internet enabled wireless device. Such software module only becomes operable when downloaded into an Internet enabled wireless device.

Such wireless device can be any Internet enabled wireless device, mobile phone, smartphone, tablet, iPOD, iPAD or any such other wireless device type with at least or more wireless radio interfaces, such as BLUETOOTH, Wi-Fi, WiMax, GPRS, GSM 2G, 3G, 4G, LTE, CDMA, WCDMA or nay such other current or future wireless radio technology.

All wireless devices become automatically an authorized wireless device, when a software module is downloaded into an Internet enabled wireless device, which renders such software module then operable. Each user of an authorized wireless devices with a build-in software module defines the parameters or conditions under which the end-user of such wireless devices with a build-in software module allows automatic Internet sharing of his wireless devices with a build-in software module with any such other different to the previous authorized wireless devices with a build-in software module.

A typical list of parameters or conditions set by an end-user of an authorized wireless devices with a build-in software module are as a matter of the example, although can be different than those listed herein next: Allow automatic Internet sharing with other authorized wireless devices with a build-in software module if:

the month to date network operator data allowance amount used up is not above a user defined threshold and if not defined then the software module sets such maximum threshold figure (optional user sets monthly start and stop date for data usage calculation and if not defined then the software module sets those as the first day of a calendar month as the start date and the last calendar day of each month as the end date)

the wireless device is connected to a free data connection, such as free Wi-Fi or BLUETOOTH data connection, if such information is available to the software module the wireless device battery level is not below a user defined threshold and if not defined then the software module sets a minimum level the wireless device data connection is not a roaming data connected.

Optionally a system server can be made part of this invention, connected to the Internet, when embedding a software module of this invention becomes operable together with the software modules downloaded into the Internet enabled wireless devices to form a different embodiment of the present invention. Such server(s) with a build-in software module and connected to the Internet may be hosted by the same party as the party operating the WINICS or hosted by third party or parties on behalf of the party operating the WINICS of this invention.

Such optional server with a build-in software module may be one or a multiple amount of servers in a single location or spread over different geographical locations, as to allow for massive user growth and the corresponding standard known in the industry as servers load balancers and geographical colocation to improve access latency.

The present invention does not claim any prior art on well established and known servers hardware, virtualized servers, server software or firmware, servers architectures, server load balancing, local or geographical server clusters latency as these are well documented amongst others at the URL www.cisco.com by companies like CISCO and many others.

Our invention claims are limited and specific to the software module that become operable when downloaded into any such Internet enabled wireless devices where all such software modules operable together and optionally with the corresponding servers with a build-in software module jointly form this invention WINICS.

To illustrate one embodiment of the present invention, let's take the example of a smartphone user with a downloaded software module (USER-A). This USER-A is roaming in country B and though he has a valid SIM of home country A that functions in country B, the USER A has disabled roaming data to avoid excessive roaming costs. USER-A is however within BLUETOOTH coverage of a different smartphone with a build-in software module (USER-B). Both USER-A and USER-B are registered users of the WINICS; simply by having the software modules downloaded into their devices and are thus authorized WINICS users. USER-B is not roaming but has a local SIM and has sufficient battery and sufficient unused data bundle with his local mobile operator in country B and USER-B is connected to the 4G data mobile network operator in country B (MNO-B) or in other words with direct Internet access to MVNO-B.

Software module of USER-A smartphone communicates over BLUETOOTH with software module of USER-B smartphone, whereas USER-B smartphone auto-clears authorization of USER-A, because USER-A has a downloaded software module of this invention and then provided that USER-B parameters allow USER-A to connect to the Internet then USER-B software module shares it's Internet data connection with USER-A through BLUETOOTH through USER-B with MVNO-B.

A different embodiment of the present invention is applicable with the same as previous example but with the data communication between USER-A smartphone and USER-B smartphone through Wi-Fi instead of through BLUETOOTH.

Another different embodiment of the present invention is applicable where previous mentioned USER-A smartphone has no data allowance left anymore, (applicable when roaming or when in home country alike) and USER-B parameters allow for Internet sharing and whereas USER-B has a data connection to the Internet through Wi-Fi but has no BLUETOOTH, then the software module of USER-B disconnects if USER-B parameters alone will disconnect from Wi-Fi and reconnects USER-B Internet data connection through mobile data instead of Wi-Fi and communicates with USER-A then over Wi-Fi and thus shares USER-B Internet data with USER-A through Wi-Fi.

In fact the software module of USER-B automatically without user intervention turns USER-B smartphone into a hotspot; Wi-Fi to mobile data, BLUETOOTH to mobile data, Wi-Fi to BLUETOOTH, BLUETOOTH to Wi-Fi, depending on USER-B Internet data connection availability. Say if USER-B only has Internet data connection available within USER-B set parameters in his current location over mobile data, then USER-B connects on one side of its hotspot function to mobile data and on the other side connects with USER-A to share such Internet connection through BLUETOOTH or Wi-Fi, whichever is available to both USER-A and USER-B and in the event both are available whichever of the two provides the best connection quality (highest radio signal strength and/or lowest bit error rate) or the highest Internet speed.

In a different embodiment of the present invention when a wireless device with a downloaded software module of this invention has no direct Internet access, then the software module will through the wireless device send a beacon through the available WLAN radio, such as Wi-Fi or BLUETOOTH. In this embodiment wireless device with a downloaded software module of this invention which have direct Internet access, then the software module will through the wireless device scan through all available WLAN, such as Wi-Fi or BLUETOOTH in receive mode only, for a beacon of neighbouring wireless device with a downloaded software module of this invention. This can be beneficial to keep power consumption down for those devices with a direct Internet connection as they only consume the very lower power during receive mode of WLAN receivers (i.e. Wi-Fi and/or BLUETOOTH receivers). On the other hand those devices that have no direct Internet connection will only transmit the beacon when the device user wishes to access the Internet, such as for example when it wakes up the wireless devices detected in the form of backlight switching on or transition to wake-up state. The software module in the wireless device can have optionally a user setting to allow the user to set his wireless device to always transmit a beacon of this invention when the device has no direct Internet access or to safe power to put the setting to only send the beacon when the wireless device with no direct Internet access has the screen active by the user using his device (backlight on or wake-up detected or other similar detection trigger) and keep the beacon so long that condition applies until the users stops using his device ((backlight off or sleep detected or other similar detection trigger). In this way when a wireless device with a downloaded software module of this invention AND with direct Internet access detects a beacon from a wireless device with a downloaded software module of this invention without direct Internet access, then both devices software modules will automatically interact without any user intervention and automatically connect the wireless device with no direct Internet to the Internet through the wireless device with direct Internet connection. If the beacon received by the wireless device with a downloaded software module of this invention with direct Internet access is through the same radio module as the one through which it receives direct Internet, in example Wi-Fi, then the software module of the wireless device with direct Internet access will cause the wireless device without direct Internet access to switch to another different jointly available radio module, in example BLUETOOTH, or vice-versa such that the direct Internet access radio is different than the radio used towards the device without direct Internet access.

This WINICS is particularly beneficial for the general public users of wireless devices (mobile phones, smartphones, tablets) and in particular for the younger population even when in their own home country or students or immigrants in countries away from home or the general public when on holiday abroad or when home but having spent their monthly data allowance.

Let's assume for illustration purposes that only as little as 10% of the previous mentioned 7.1 Billion mobile subscribers would download this invention's software module, if made available for free, onto their Internet enabled wireless device (smartphone and/or tablet) and set their user parameters preferences, even with or without this invention's optional server with a build-on software module. That means that 700 million smartphones, with a build-in or downloaded software module, with a higher concentration of these devices in saturated mobile markets then in non-saturated regions, would form a global WIRELESS INDIRECT INTERNET CONNECT SYSTEM (WINICS) where such wireless devices with a downloaded software module are not fixed but move together with the movements of their end-users. Thus the statistical possibility that a user of an Internet enabled smartphone with a downloaded software module (USER-A) is within Wi-Fi or BLUETOOTH coverage range of another different neighbouring Internet enabled smartphone with a downloaded software module (USER-B) is very high but is the highest in saturated regions and increases as the amount of users that download the software module of this invention on their wireless devices increases. Frequently visited public places, such as airports, public buildings, shopping malls, bars, restaurants, public gathering places such as parks, concerts, etc. are particularly high saturation places where many wireless device users concentrate and thus are places for in country users but more importantly for roaming users where this invention illustrate the vast benefits from this invention.

When incorporating to this invention an optional system server with a built-in software module, which can also act as a data server, then the connections from and to wireless devices with a downloaded software module is not limited to Internet sharing but can include also the transfer of any digital data asset or information to improve or enhance the end-user experience of this invention, such as sharing geographical GPS (geographical position system) location of nearby other wireless devices with a downloaded software module, sharing default parameter settings etc.

The optional system server with a built-in software module may optionally also host the proprietary software module of this invention for download by Internet enabled wireless devices. Typically the software module of this invention can be made available for download by Internet enabled wireless devices on servers specifically dedicated to software download for smartphones, tablets and similar devices such as on servers known as the AppStore by Apple for it's iPOD, iPHONE, iPAD, the PlayStore by GOOGLE for Android devices with the Google operating systems, Amazon, AppStore, Samsung Store, GALAXY APPS, WINDOWS PHONE Store, MICROSOFT mobile Apps, NOKIA Apps Store also known in the past as OVI store or as Opera mobile store, etc.

In a different preferred embodiment of the present invention the software module required to be downloaded into a wireless device is a sub-module of a wireless device operating system, where when downloading the operating system which incorporates a sub-module which is this invention's software module, makes the software module operable when downloading the operating system into a wireless device. The operating system, which incorporates a sub-module, which is this invention's software module, is available for download by wireless devices supporting such operating system(s) from the server associated to the company owner of such operating system. All such operating systems with a sub-module software module of this invention jointly form another preferred embodiment of the present invention. Optionally the company owner of such operating system(s) also has a server connected to the Internet where the WINICS server software module resides and which together with the operating system with a sub-module software module of this invention form another different preferred embodiment of the present invention.

As a matter of illustration the software module can be embedded into one or more of the following mobile operating systems: Android, iOS, WINDOWS PHONE, BLACKBERRY, AMAZON KINDLE Android, etc.

As a matter of illustration, according to the website at the URL en.wikipedia.org/wiki/Mobile_operating_system the following info has been extracted: "On September 2014 Android's global market share rose to 85%. As of September 2014, iOS global market share was 11%. As of September 2014, Windows Phone market share was 3%. Once one of the dominant platforms in the world, it's global market share has been reduced to less than 1% in late 2014."

Therefore if only as little as the 2 dominant operating systems owners, GOOGLE and Apple, would integrate the software module of this invention into their future respective Android- and iOS-operating system, and optionally but not a requirement also would integrate the server software module of this invention into a corresponding Android- and iOS-server, then the operable software modules jointly and optionally with or without this invention server module would in this embodiment form instantly the biggest ever global WIRELESS INDIRECT INTERNET CONNECT SYSTEM (WINICS). In this last example, then an automatic update of current Android and iOS smartphones and tablet operating system would make 96% of all wireless devices (smartphones and tablet), meaning 96% of 5.4 Billion mobiles=5.18 Billion mobiles in use would improve their Internet access capabilities through the benefits of this invention.

Even if only one of the top 2 mobile operating systems would integrate this invention into their operating system for smartphones and tablets through the corresponding operating system owner servers, then the instant amount of global end-users that would benefit from this invention and thereby increase dramatically the Internet connectivity of smartphones and tablet. According to the references quoted in BACKGROUND OF THE INVENTION herein, there are currently around 5.4B mobiles in use and with integrating this invention only into the Android operating system it would already provide 85% of 5.4 Billion mobiles=4.59

Billion mobiles instant access to the benefits of this invention with increased Internet connectivity for those smartphones and tablets.

In order not to limit the benefits of this invention, when more than one operating system integrates the present invention into the combination of embedding the software module in the wireless device operating system and optionally the WINICS server software module into the corresponding operating system owner server(s) to jointly form this invention's WINICS, it is imperative that owner of different operating systems, such as for example GOOGLE as owner of Android operating system, Apple as owner of iOS operating system, MICROSOFT as owner of MICROSOFT Phone operating system, RIM as owner of BLACKBERRY operating system, etc. use a common jointly agreed or standardized interface protocol for the wireless interface protocol between software modules (embedded in operating system) downloaded in different wireless devices of different operating system.

This last would ensure inter-operability of all wireless devices with a downloaded software module embedded in the operating system, regardless of the operating system type or owner and regardless of each operating system corresponding WINICS system server software module being in different servers from different operating system owners (Apple, GOOGLE, MICROSOFT, BLACKBERRY, etc.).

BRIEF DESCRIPTION OF THE SEVERAL VIEWS OF THE DRAWINGS

FIG. 2 shows the geographical radio coverage of each wireless device and each of the two different Cellular or Mobile Network Operators A and B in this example are in the same country although in a different embodiment of the present invention each could be in a different country. A way to better understand FIG. 2 is consider it as a geographical map of FIG. 1 wherein the oval or circular shapes represent the coverage area of each network or device. When it's a Mobile Network then it represents the cellular or mobile coverage from the network's infrastructure base-stations (GPRS-, 2G, 3G, 4G, LTE, WCDMA- or any such other similar cellular base-station standard transceivers) and when it's a wireless device then it's the hotspot coverage area from a wireless device such as from a smartphone or tablet through the wireless device build-in Wi-Fi, BLUETOOTH or any other similar standard low power radio transceiver.

FIG. 3 is part representation of FIG. 1, which corresponds to the Wireless device 4 (WD4) indirect connections to the Internet within the present invention WINICS (novelty represented in FIG. 3 jointly by 404.1, 401.1 and optionally including 200.1) between time T0 and T1 of FIG. 2. The bi-directional indirect Internet connection is established automatically between 404.1 and 401.1, respectively from device 404, through Wi-Fi connection 500.8, through device 401, through mobile or cellular connection 500.1, through Mobile Network 300.1, through gateway data connection 500.2 to the Internet 100 and reverse as a bidirectional Internet connection back from 100 to device 404. Both software modules 404.1 and 401.1 optionally communicate with the WINICS Server module 200.1 through the Internet 100, through data connection 500.7 with server 200 with a build-in software module 200.1 (WINICS optional Server module) for example to exchange GPS location of other wireless devices with a downloaded Software Module which are not in range for example of WD4.

FIG. 4 is part representation of FIG. 1, which corresponds to the WD4 (404) indirect connections to the Internet within the present invention WINICS (novelty represented in FIG. 4 jointly by 404.1, 402.1 and optionally including 200.1) between time T1 and T2 of FIG. 2.

FIG. 5 is part representation of FIG. 1, which corresponds to the WD4 (404) indirect connections to the Internet within the present invention WINICS (novelty represented in FIG. 5 jointly by 404.1, 403.1 and optionally including 200.1) between time T3 and T4 of FIG. 2.

FIG. 6 is a different way of representing FIG. 3, namely as coverage are represented by the oval circles which are self explanatory when viewing FIG. 6 and 3 simultaneously next to each other.

FIG. 7 is a different way of representing FIG. 4, namely as coverage are represented by the oval circles which are self explanatory when viewing FIG. 7 and 4 simultaneously next to each other.

FIG. 8 is a different way of representing FIG. 5, namely as coverage are represented by the oval circles which are self explanatory when viewing FIG. 8 and 5 simultaneously next to each other.

DETAILED DESCRIPTION OF THE INVENTION

Figure 1:
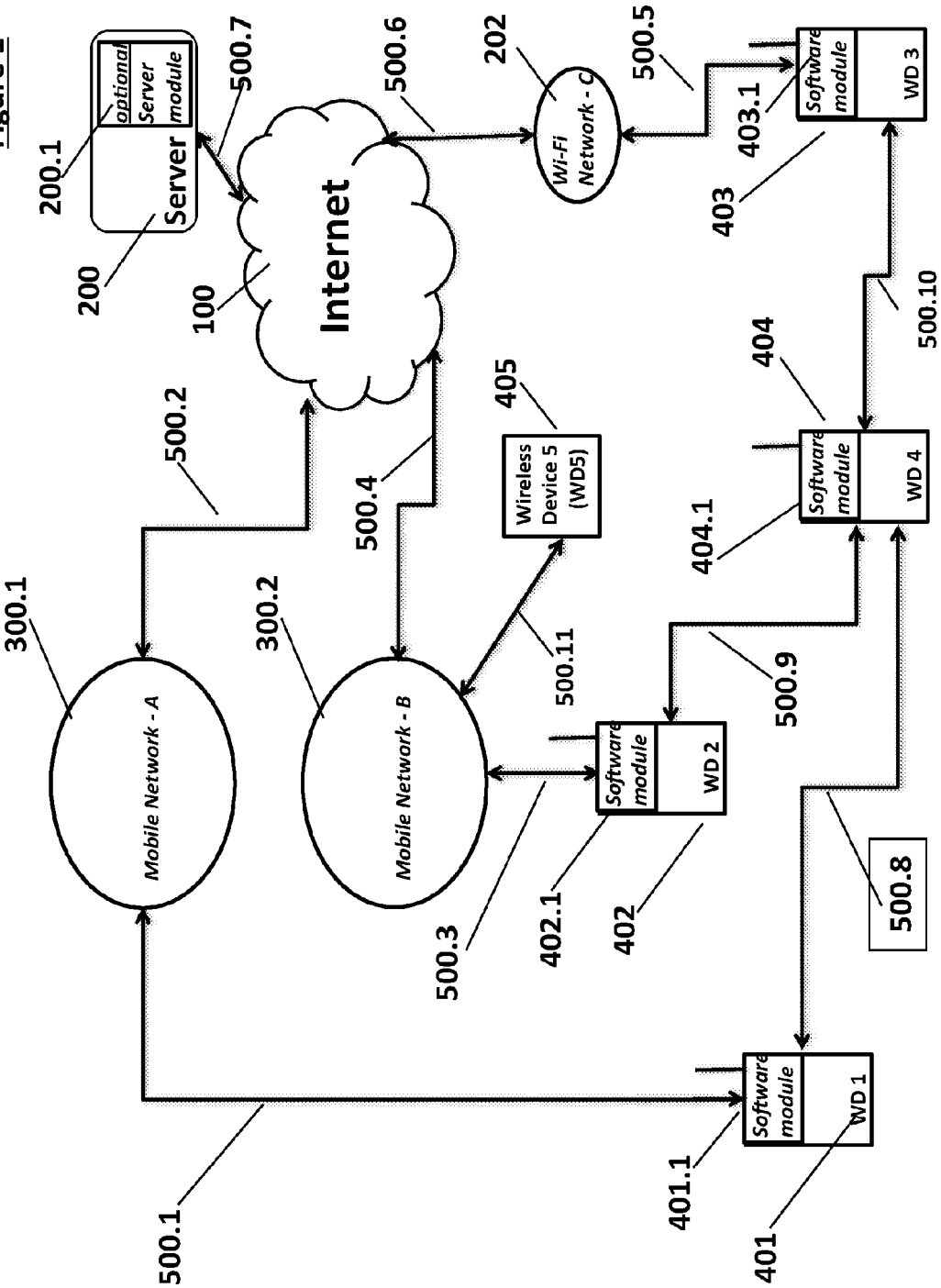
FIG. 1 represents a typical embodiment of present invention system, WIRELESS INDIRECT INTERNET CONNECT SYSTEM (novelty represented in FIG. 1 jointly by 401.1, 402.1. 403.1, 404.1 and optionally including 200.1). As an example wireless devices (WD) 401, 402, 403 and 405 have a direct Internet connection respectively to 300.1, 300.2, 202 and 300.2 whilst wireless device 404 (WD4) does not have any direct wireless Internet available. All wireless devices, except for 405 (WD5) have a downloaded Software Module of this invention, such that a wireless device without any direct Internet connection 404 (WD4) through its downloaded Software module of this invention (404.1) can communicate directly and automatically only through other neighbouring wireless devices (WD1, Wd2 or Wd3) with a downloaded Software module (401.1, 402.1 or 403.1) and connected indirectly and automatically through one of such neighbouring Software Modules to the Internet, even without any interaction nor any authentication with any server. The optional server 200 with a build-in or downloaded Server Module of this invention allows any Software Module 401.1, 402.1, 402.1, 404.1, etc. downloaded into any wireless device to communicate information of the corresponding wireless device WD1, WD2, WD3, WD4, etc. to the Server Module 200.1 and vice versa to receive information from any neighbouring wireless devices (even if not in coverage range) with a downloaded Software Module from the Server Module 200.1 during such times when connected through the Internet.

Specifically, FIG. 1 is a top-level block diagram of a communications system in accordance with the present invention. It includes wireless devices and optionally media servers interconnected and communicating with each other through the Internet wirelessly. It also shows the overall basic functionality, with respect to the WIRELESS INDI- RECT INTERNET CONNECT SYSTEM (WINICS) of this invention, wherein the novelty lies in the combination of the software module downloaded into Internet enabled wireless devices that then makes such software module operable. The WINICS can incorporate optionally a server module embedded into a server connected to the Internet and accessible by the wireless devices with a downloaded software module of the present invention. As a matter of illustration to explain how the FIG. 1 WINICS works, let's make the following assumptions:

Wireless Device 1 to 4 (401 to 404) each have downloaded the software module (401.1 to 404.1) of this WINICS invention whilst Wireless Device 5 (405) does not have any such software module of this invention. All devices are in the same country for this example.

Wireless Device 1, 2 and 4 are smartphones with a valid SIM, Wireless Device 3 is a tablet without any cellular radio module thus without a SIM, Wireless Device 5 is a MiFi hotspot with a valid SIM.

Wireless Device 1 (401) has a wireless data connection (500.1) to his home mobile network operator-A (300.1) thus has a SIM-A and registers to HLR-A Wireless Device 2 (402) has a wireless data connection (500.3) to his home mobile network operator-B (300.2) thus has a SIM-B and registers to HLR-B Wireless Device 3 (404) has a wireless data connection (500.5) to a Wi-Fi wireless network operator-C or Wi-Fi hotspot (202).

Operator A and B (300.1 and 300.2) are different mobile network operators but provide mobile coverage in the same country in FIG. 1.

Wireless Device 4 (404) and Wireless Device 5 (405) are Roaming in FIG. 1, each with a valid SIM associated to their own corresponding home network in a different country then the country of FIG. 1. Both Wireless Device 4 and Wireless Device 5 are roaming on Mobile Network-B (300.2) and thus each their SIM is registered to VLR-B as a guest-roaming user.

Wireless Device 4 (404) has his data Roaming setting manually put to OFF.

Wireless devices with a downloaded software module of this invention can share their GPS location and user set parameters, updating these on location change or on regular predefined time intervals provided there is any change of such parameters, with the corresponding optional system server (200) with a build-in or downloaded server module (200.1) of this invention that jointly form an embodiment variant of the present invention.

Let's consider the user of Wireless Device 4 (404) with a downloaded software module (404.1) of this invention (jointly 404 and 404.1 referred to hereinafter as WD4) as an authorised user of the system of this invention, wherein a user is considered an authorised wireless user of this system invention upon downloading this invention's software module into an Internet enabled wireless device. The WD4 user wishes to connect to the Internet but has data roaming disabled in order to avoid incurring high roaming data costs yet wishes to access the Internet. Transparent to the WD4 user, the WD4 software module 404.1 instructs 404 to scans for neighbouring wireless devices and 404.1 instructs 404 to connect only to another wireless device with a build-in software module with the highest radio signal strength that has direct Internet connection. For the purpose of this illustration the highest radio (Wi-Fi) signal strength is from WD5 and the second highest radio (BLUETOOTH) signal strength is from WD1. The WD4 will not connect to WD5 Wi-Fi because it doesn't have authorisation (WD4 does not have Wi-Fi password of WD5) as that MiFi device is from a 3rd party user of a Wireless device with no downloaded software module as per this invention. So WD4 will make a BLUETOOTH data connection (500.8) with WD1 (jointly 401 and 401.1 referred to hereinafter as WD1) and transparent to the user of WD1, as per his account settings, WD1 will automatically turn the WD1 into a temporary hotspot allowing WD4 Internet connection through wireless BLUETOOTH link 500.8 and then through cellular data connection 500.1 with Mobile Network-A (300.1) then through gateway connection 500.2 to the Internet bi-directionally.

Since wireless devices are carried by end-users and change location over time, then to illustrate real life situations, let's assume that WD4 (404) user moves away from WD1 (401) user and the WD1 BLUETOOTH radio signal strength becomes less than the Wi-Fi radio signal strength of another wireless device 2 with a downloaded software module of this invention (jointly 402 and 402.1 referred to hereinafter as WD2) shown as WD2 on FIG. 1. Then if WD2 software module (401.1) account settings allow for automatic sharing then WD4 software module (404.1) will have WD4 automatically re-connect to WD2 as soon as signal strength Wi-Fi of WD2 is higher than signal strength of BLUETOOTH WD1. In this scenario then the user of WD4 will simply have a very brief interruption of no Internet access but without any user intervention automatically continue to have Internet access because the WD4 software module (404.1) has disconnected device 404 from wireless BLUETOOTH connection 500.8 and connected instead to wireless Wi-Fi connection 500.9 as authorized by wireless module (402.1) of WD2. Thus WD4 connects to the Internet through wireless Wi-Fi data link 500.9 through device 402 to cellular mobile network data link 500.3, then through the mobile network 300.2 then through the cellular gateway connection 500.4 connected to the Internet bi-directionally.

Let's now assume that WD4 user stays put on the same place but loses Internet connection because both WD1 and WD2 users move out of range of WD4. Since software modules (401.1, 402.1, 403.1 and 404.1) downloaded into wireless devices (401, 402, 403 and 404) optionally update their parameters with the corresponding optional server software module (200.1) build-into the optional system server (200) and the software module (200.1) shares the info requested, for example by software module 404.1 who received the info of the neighbouring wireless devices with a build-in software module such as the last known GPS location of the closest authorized device 403 with a downloaded software module 403.1 (jointly 403 and 403.1 referred to hereinafter as WD3).

The downloaded software module 404.1 will then notify the user of WD4 if he attempts to connect to the Internet that no Internet access can be provided but will suggest the user to move to the location of the nearest GPS location within walking distance where the WIRELESS INDIRECT INTERNET CONNECT SYSTEM (WINICS) could provide Internet access from WD3.

Let's assume WD4 user walks in the direction of the GPS location of wireless device 403 and when within range of the BLUETOOTH radio signal of 403, then the software module 404.1 of wireless device 404 communicates with software module 403.1 of wireless device 403 through the BLUETOOTH wireless data link 500.10 and let's assume further that the settings of 403.1 did not allow for automatic indirect Internet connection by another software module of this invention and thus WD3 user will be notified through the software module 403.1 that an authorized WINICS user is requesting to connect but the parameters of WD3 do not allow it at this point in time. For example WD3 could have reached the maximum limit of monthly amount of data it was willing to share with authorized WINICS user or simply because WD3 battery level is below the minimum allowed user settings in 403.1 which can only be changed or allowed access then manually by the WD3 user. If WD3 manually changes the 403.1 settings to allow indirect Internet access or explicitly manually allows only for this one time such Indirect Internet access by 404.1 of WD4 user, only then WD4 will connect bi-directionally to the Internet through wireless BLUETOOTH data link 500.10, through wireless device 403, through Wi-Fi data link 500.5, through Wi-Fi Network-C (202), through gateway connection 500.6 to the Internet.

Software modules (400.1, 402.1, 403.1, 404.1, etc.), which become operable when downloaded into wireless devices, and are operable to also communicate which the corresponding optional server module 200.1 of this invention, build-into an optional server 200 and connected to the Internet through the data link 500.7.

In a different embodiment, Wi-Fi Network-C (202) could be a Wi-Fi router in a private home, in an office or in a public place. As a matter of example 202 could be a public hotspot and 403 a wireless device of an authorized user of such public hotspot as an illustration that this invention (based on moving wireless devices) can co-exist with existing prior-art yet resolving their shortcomings of fixed hotspots based prior art. For example user of device 403 if an authorized user of such public fixed hotspot yet downloads the software module of this invention in his smartphone then in the geographical locations as described herein previously where there is no public hotspot radio coverage but there is wireless devices WD1 and/or WD2 within Wi-Fi or BLUETOOTH coverage of WD3. In this case such public hotspot user's smartphone with this invention's downloaded software module (WD3) could benefit of the solutions of this invention rather than be limited by the prior art. Actually this invention does not require a user to have any authorization of any fixed hotspot nor any mobile network of the prior art but simply requires a wireless device to download the software module of this invention that jointly form the novelty of this invention without requiring users to purchase any additional hardware, such as a Wi-Fi router or a MiFi device and having data credit by the wireless device users with a downloaded software module of this invention is not required in the present invention in complete contrast with the prior art.

Figure 2:
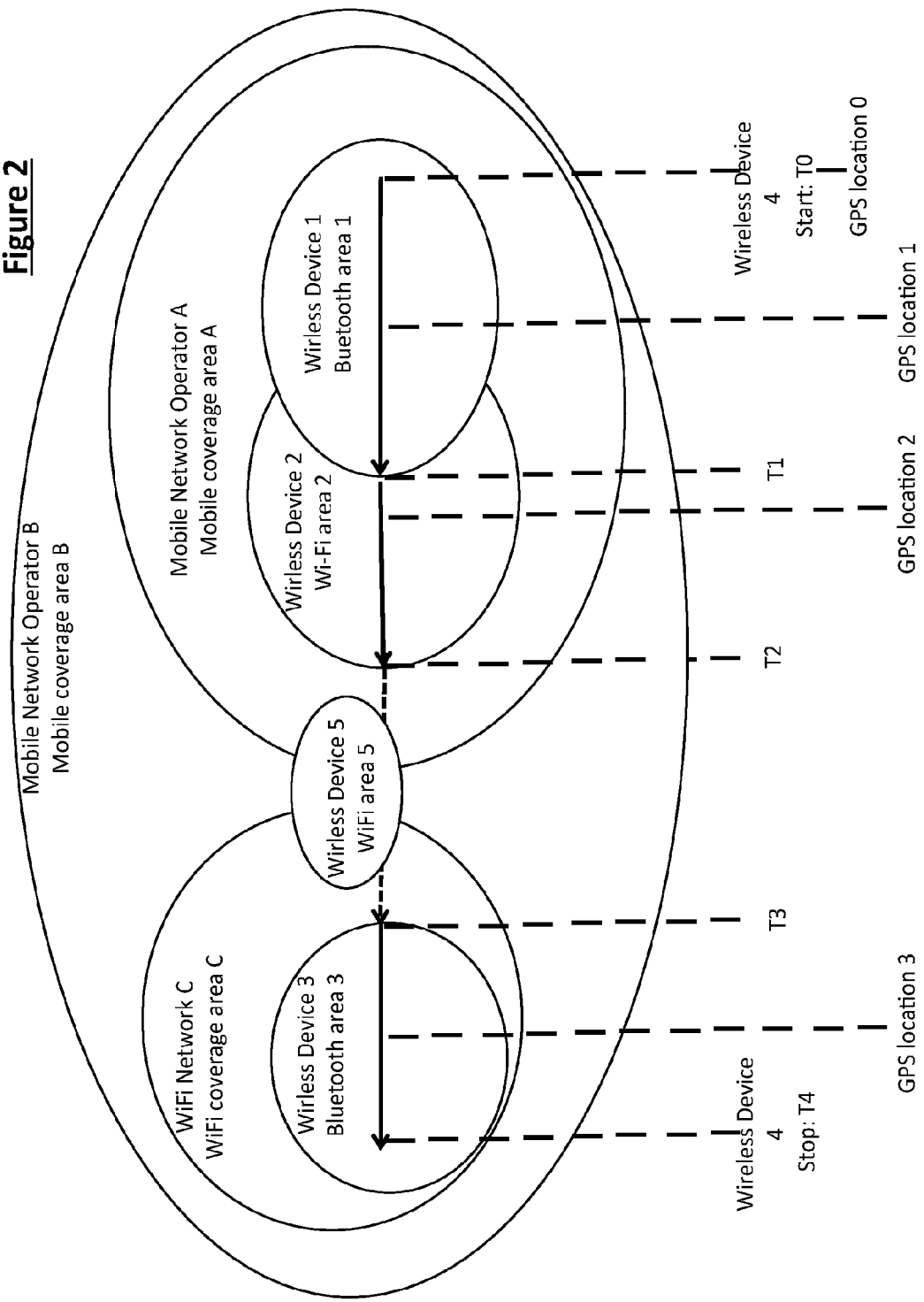
FIG. 2 shows a geographical representation of previous FIG. 1 of the present invention with respect to the proprietary WIRELESS INDIRECT INTERNET CONNECT SYSTEM (WINICS).

FIG. 2 are the geographical representation of previous FIG. 1 of the present invention with respect to the WINICS. The previous explanation of FIG. 1 is applicable in its entirety on FIG. 2 wherein WD4 (see FIG. 1 device 404 with a downloaded software module 404.1) starts moving at time T0 from GPS position 0 direction GPS location 1, after time T1 the user WD4 moves from GPS location 1 towards GPS location 2, at time T2 moves from GPS location 2 towards GPS location 3, at time T3 keeps moving towards GPS location 3 and finally WD4 user stops moving at time T4 at GPS location 4. The WD4 is between time T0 and T1 within radio coverage of wireless device 1-BLUETOOTH area 1, between time T1 and T2 within radio coverage of wireless device 2-Wi-Fi area 2, between time T2 and T3 within NO radio coverage of any neighbouring wireless device with a downloaded software module, and between time T3 and T4 within radio coverage of wireless device 3-BLUETOOTH area 3, and wherein;

Wireless device 1 (WD1) of FIG. 2 is 401 with downloaded software module 401.1 of FIG. 1.

BLUETOOTH area 1 is the geographical BLUETOOTH radio coverage area of 401 of FIG. 1.

GPS location 1 is the geographical position system coordinates of 401 of FIG. 1.

Wireless device 2 (WD2) of FIG. 2 is 402 with downloaded software module 402.1 of FIG. 1.

Wi-Fi area 2 is the geographical Wi-Fi radio coverage area of 402 of FIG. 1.

GPS location 2 is the geographical position system coordinates of 402 of FIG. 1.

Wireless device 3 (WD3) of FIG. 2 is 403 with downloaded software module 403.1 of FIG. 1.

BLUETOOTH area 3 is the geographical BLUETOOTH radio coverage area of 403 of FIG. 1.

GPS location 3 is the geographical position system coordinates of 403 of FIG. 1.

Wireless device 5 (WD5) of FIG. 2 is 405 with NO downloaded software module of FIG. 1.

Wi-Fi area 5 is the geographical Wi-Fi radio coverage area of 405 of FIG. 1.

GPS location 5 is not shown in FIG. 2 because it is unknown to this invention optional system server 200, because device 405 has no downloaded software and thus is not authorised to communicate with server module 200.1 of this invention as per FIG. 1.

Mobile Network Operator B of FIG. 2 represents 300.2 of FIG. 1 and provides cellular or mobile radio coverage for wireless device 2 and wireless device 5 of FIG. 2, which are respectively 402 and 405 of FIG. 1.

Mobile Network Operator A of FIG. 2 represents 300.1 of FIG. 1 and provides cellular or mobile radio coverage for wireless device 1 and wireless device 4 of FIG. 2, which are respectively 401 and 404 of FIG. 1.

Wi-Fi Network C of FIG. 2 represents 202 of FIG. 1 and provides Wi-Fi (non cellular, non mobile) radio coverage for wireless device 3 of FIG. 2, which corresponds to 403 of FIG. 1.

Figure 3:
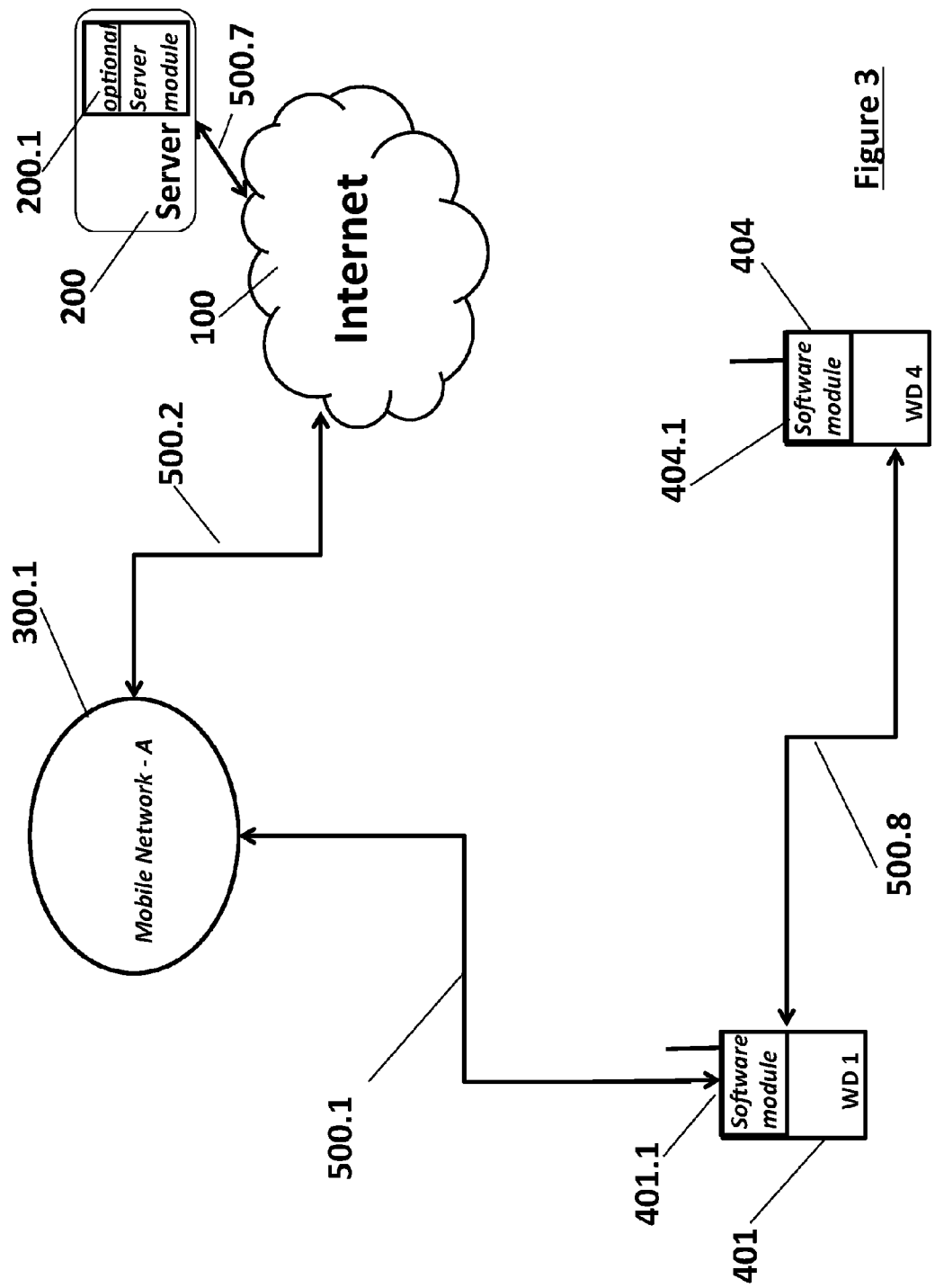
FIGS. 3 to 5 are implementations of the present invention with respect to the proprietary WINICS.
Figure 4:
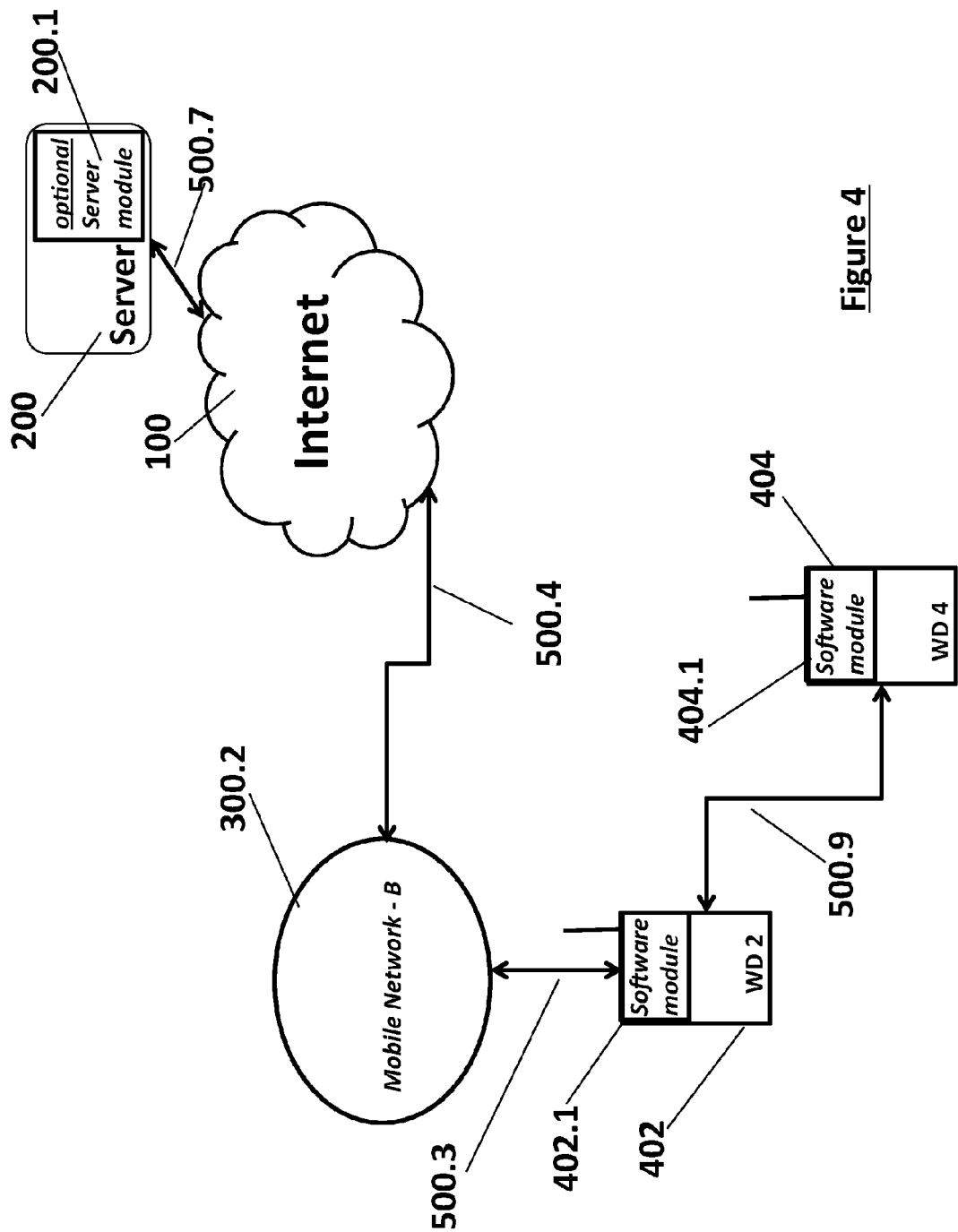
Figure 5:
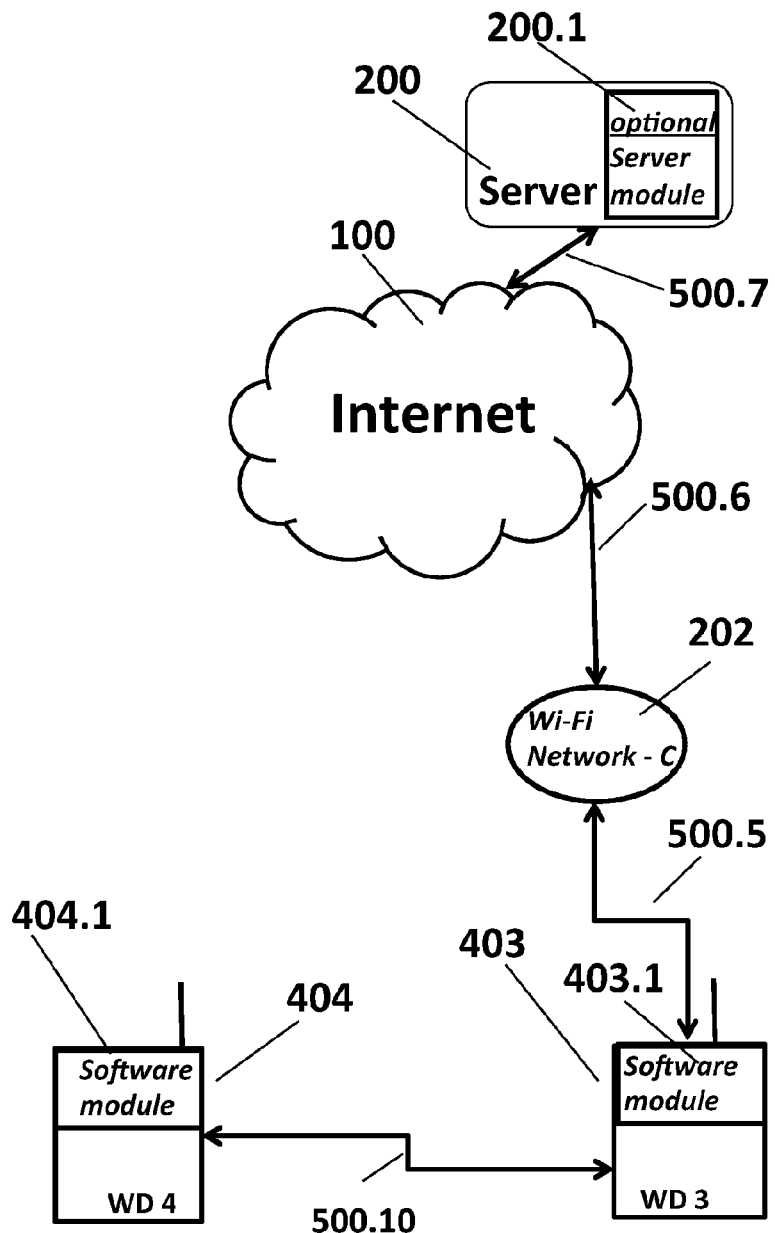

With previous detailed descriptions of FIGS. 1 and 2 it makes FIGS. 3 to 5 self-explanatory as each represents a corresponding part of previous FIGS. 1 and 2, respectively FIG. 3, over time periods T0 to T1, FIG. 4 over time period T1 to T2 and FIG. 5 over time period T3 to T4.

Figure 6:
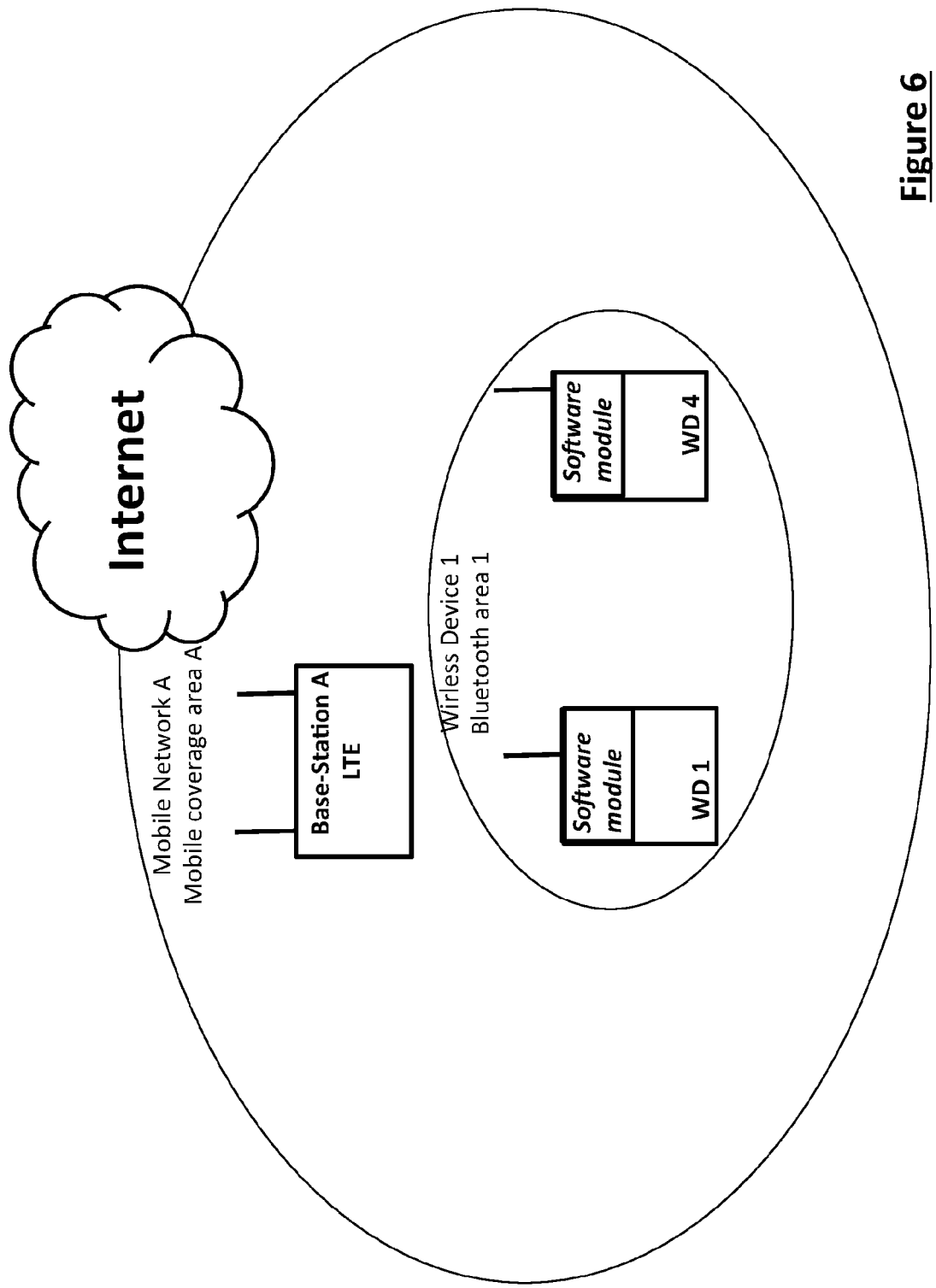
FIGS. 6 to 8 are implementations of the present invention with respect to the proprietary WINICS.
Figure 7:
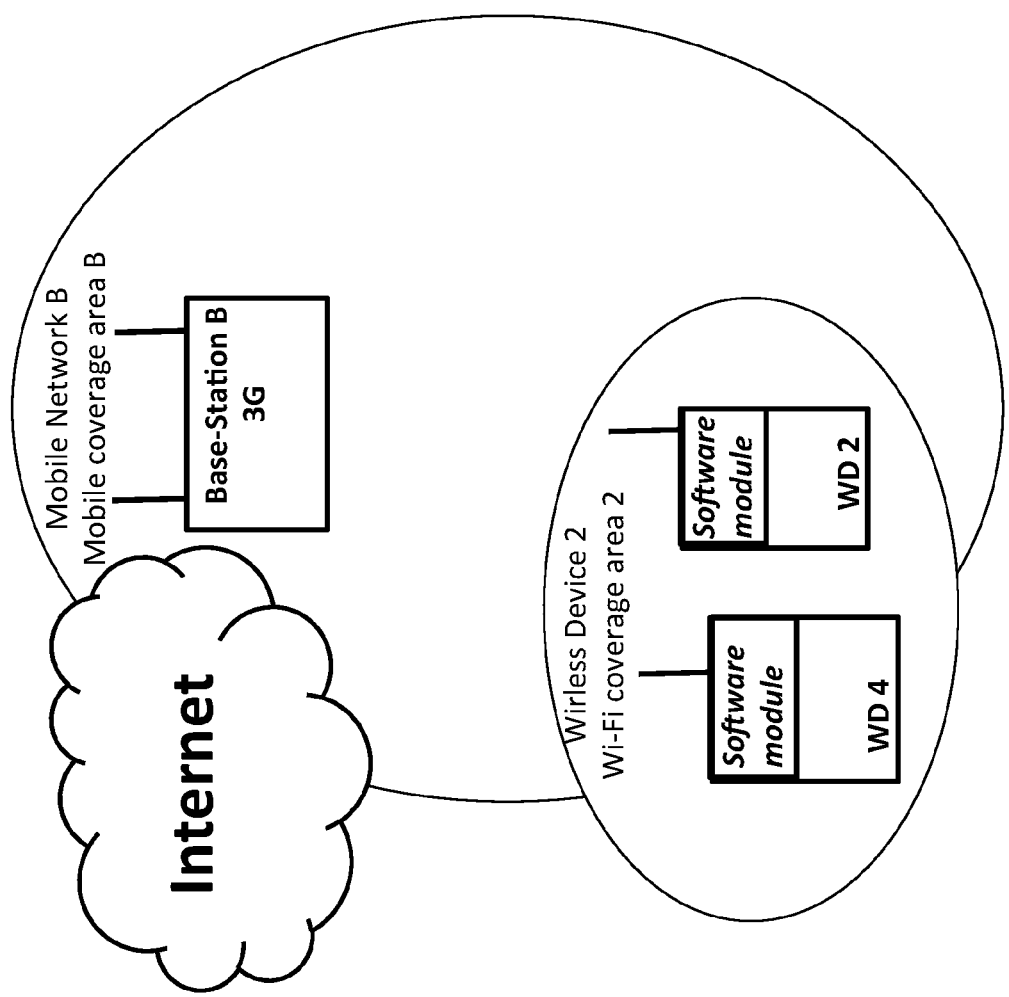
Figure 8:
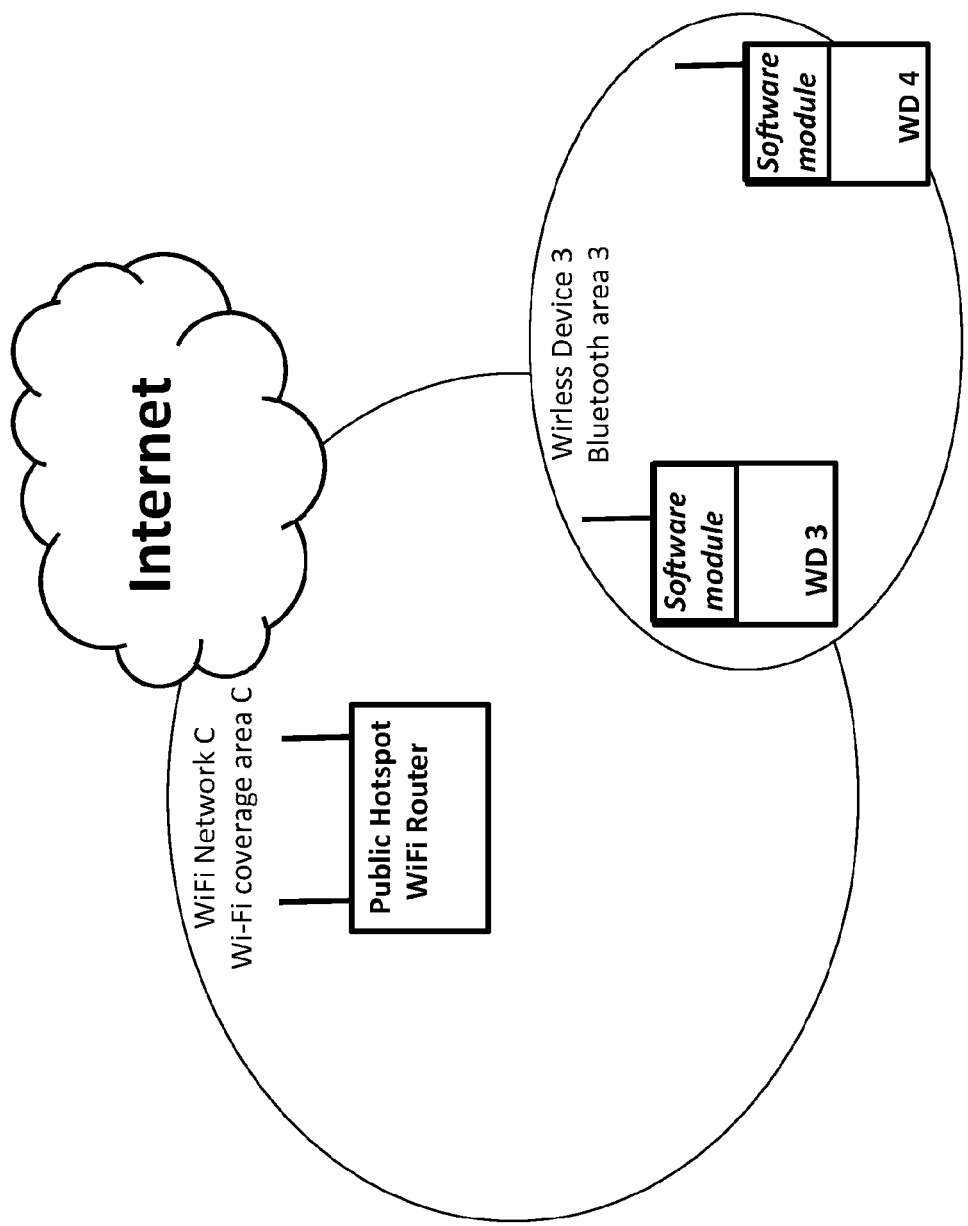

Previous descriptions of FIGS. 1, 2 and 3 to 5 make FIGS. 6 to 8 self-explanatory as each of FIGS. 6 to 8 corresponds respectively to FIGS. 3 to 5, namely FIG. 6 represents a geographical coverage illustration of FIG. 3, FIG. 7 represents a geographical coverage illustration of FIG. 4, and FIG. 8 represents a geographical coverage illustration of FIG. 5.

Concepts

1. A wireless communication system, WIRELESS INDIRECT INTERNET CONNECT SYSTEM (WINICS), comprising of wireless devices with a downloaded software module without requiring the use of a VPN (virtual private network) and wherein;

a) the wireless devices are Internet enabled mobile phones, smartphones or tablets, with at least two or more different build-in radio transceivers of which one radio transceiver is at least one local area transceiver (Wi-Fi or BLUETOOTH), adapted to download the software module. Such a wireless device (WD) when downloading the software module (SM) automatically upon download of the SM into the WD makes the SM operable to access the WD functions and also makes the SM operable to communicate with any such other SM downloaded into any such different wireless device (WDn). Any such different wireless device (WDn) becomes also automatically an authorised wireless device of the WINICS upon download of the SM into such WDn;

b) the software module (SM1) operable when downloaded into the wireless device (WD1), such WD1 without direct Internet data connection within range, then the SM1 communicates with such nearby software module (SM2) downloaded into a different wireless device (WD2) within range of WD1, such WD2 with direct Internet data connection. SM1 and SM2 communicate through such WD1 and WD2 commonly available and compatible wireless local area data connection (Wi-Fi or BLUETOOTH), meaning any such non-mobile network data connection between WD1 and WD2, such that WD1 through the software modules SM1 and SM2 establishes automatically an indirect bidirectional Internet data connection from WD1 through WD2 with the Internet.

c) all the software modules of this concept 1, downloaded into wireless devices globally, jointly form the WINICS.

2. The wireless communication system of Concept 1 in which the following parameters can be set as part of the software module by users of the wireless devices with a downloaded software module.

A Wireless Devices with a downloaded software module with direct Internet connection only allows automatic Internet access to any such other wireless device with a downloaded software module without direct Internet access if all following conditions apply:

the month to date total wireless device used Internet data amount is not above the user set monthly data amount threshold and if not set by the user then the software module will set a minimum monthly data amount threshold wherein the month to date start and stop date are set by the user and if not set by the user then the software module will set a start date as the first day— and the stop date as the last day—of each calendar month the wireless device is directly connected to a data Internet connection the wireless device battery level is not below a user set wireless device battery level threshold and if not set by the user then the software module will set a minimum battery level threshold value.

Optional additional condition, only if the wireless device data connection is not a roaming data connection.

3. The wireless communication system of previous concepts 1 and 2 in which a system server with a build-in server module becomes part of the WINICS, as per concept 1, and wherein the software module when downloaded into a wireless device and when such wireless device has a direct Internet data connection, as per the restrictions of Concept 2, then also acts as a captive portal that allows Internet data access bypassing any authentication process initiated by the software module downloaded into a wireless device that does not have direct Internet data access through the wireless device with a downloaded software module that has a direct Internet data connection BUT restricted to only access those URL- (Uniform Locater Locator) or IP- (Internet Protocol) addresses of the system server.

The captive portal as a sub module of the software module then allows the software module downloaded into a wireless device that does not have direct Internet data access to communicate with the system server through the software module downloaded into a wireless device that does have direct Internet data access.

All the software modules as per concept 1, downloaded into wireless devices globally as well as all server modules as per this concept 3, downloaded into system servers globally, jointly form a WINICS.

4. The wireless communication system of Concept 1, 2 and 3 in which wireless devices with a downloaded software module communicate the following information to the system server of concept 3;

the GPS (Global Positioning System) location parameters
the parameters as per concept 2.

5. The wireless communication system of Concept 1, 2 and 3 in which the system server communicates the following information to each individual wireless device with a downloaded software module as per concept 3 as a reply to the wireless devices with a downloaded software module providing his GPS (Global Positioning System) location to the system server;

the GPS (Global Positioning System) location parameters of all the neighbouring wireless devices with a downloaded software module.

6. The wireless communication system of Concept 1, 2 and 3 in which the system server communicates the following information to each individual wireless device with a downloaded software module as per concept 3 as a reply to the wireless devices with a downloaded software requesting such information to the system server or automatically provided by the system server when any such information parameters have changed at the system server;

the default value parameters as per concept 2.

7. The wireless communication system of Concept 1, 2 and 3 in which the system server communicates the following information to each individual wireless device with a downloaded software module as per concept 3 as a reply to the wireless devices with a downloaded software requesting such information to the system server or automatically provided by the system server when any such information parameters have changed at the system server;

the new captive portal list of URL or IP addresses as per concept 3.

8. A method of operating a wireless communication system, WIRELESS INDIRECT INTERNET CONNECT SYSTEM (WINICS), comprising of wireless devices with a downloaded software module without requiring the use of a VPN (virtual private network) and wherein;

a) the wireless devices are Internet enabled mobile phones, smartphones or tablets, with at least two or more different build-in radio transceivers of which one radio transceiver is at least one local area transceiver (Wi-Fi or BLUETOOTH), adapted to download the software module. Such a wireless device (WD) when downloading the software module (SM) automatically upon download of the SM into the WD makes the SM operable to access the WD functions and also makes the SM operable to communicate with any such other SM downloaded into any such different wireless device (WDn). Any such different wireless device (WDn) becomes also automatically an authorised wireless device of the WINICS upon download of the SM into such WDn;

b) the software module (SM1) operable when downloaded into the wireless device (WD1), such WD1 without direct Internet data connection within range, then the SM1 communicates with such nearby software module (SM2) downloaded into a different wireless device (WD2) within range of WD1, such WD2 with direct Internet data connection. SM1 and SM2 communicate through such WD1 and WD2 commonly available and compatible wireless local area data connection (Wi-Fi or BLUETOOTH), meaning any such non-mobile network data connection between WD1 and WD2, such that WD1 through the software modules SM1 and SM2 establishes automatically an indirect bidirectional Internet data connection from WD1 through WD2 with the Internet.

c) all the software modules of this concept 8, downloaded into wireless devices globally, jointly form the WINICS.

9. The method of Concept 8 in which the following parameters can be set as part of the software module by users of the wireless devices with a downloaded software module.

A Wireless Devices with a downloaded software module with direct Internet connection only allows automatic Internet access to any such other wireless device with a downloaded software module without direct Internet access if all following conditions apply:

the month to date total wireless device used Internet data amount is not above the user set monthly data amount threshold and if not set by the user then the software module will set a minimum monthly data amount threshold wherein the month to date start and stop date are set by the user and if not set by the user then the software module will set a start date as the first day— and the stop date as the last day—of each calendar month the wireless device is directly connected to a data Internet connection the wireless device battery level is not below a user set wireless device battery level threshold and if not set by the user then the software module will set a minimum battery level threshold value.

Optional additional condition, only if the wireless device data connection is not a roaming data connection.

10. The method of previous concepts 8 and 9 in which a system server with a build-in server module becomes part of the WINICS, as per concept 8, and wherein the software module when downloaded into a wireless device and when such wireless device has a direct Internet data connection, as per the restrictions of Concept 9, then also acts as a captive portal that allows Internet data access bypassing any authentication process initiated by the software module downloaded into a wireless device that does not have direct Internet data access through the wireless device with a downloaded software module that has a direct Internet data connection BUT restricted to only access those URL- (Uniform Locater Locator) or IP- (Internet Protocol) addresses of the system server.

The captive portal as a sub module of the software module then allows the software module downloaded into a wireless device that does not have direct Internet data access to communicate with the system server through the software module downloaded into a wireless device that does have direct Internet data access.

All the software modules as per concept 8, downloaded into wireless devices globally as well as all server modules as per this concept 10, downloaded into system servers globally, jointly form a WINICS.

11. The method of Concept 8, 9 and 10 in which wireless devices with a downloaded software module communicate the following information to the system server of concept 10;

the GPS (Global Positioning System) location parameters
the parameters as per concept 9

12. The method of Concept 8, 9 and 10 in which the system server communicates the following information to each individual wireless device with a downloaded software module as per concept 10 as a reply to the wireless devices with a downloaded software module providing his GPS (Global Positioning System) location to the system server;

the GPS (Global Positioning System) location parameters of all the neighbouring wireless devices with a downloaded software module.

13. The method of Concept 8, 9 and 10 in which the system server communicates the following information to each individual wireless device with a downloaded software module as per concept 10 as a reply to the wireless devices with a downloaded software requesting such information to the system server or automatically provided by the system server when any such information parameters have changed at the system server;

the default value parameters as per concept 9.

14. The method of Concept 8, 9 and 10 in which the system server communicates the following information to each individual wireless device with a downloaded software module as per concept 10 as a reply to the wireless devices with a downloaded software requesting such information to the system server or automatically provided by the system server when any such information parameters have changed at the system server;

the new captive portal list of URL or IP addresses as per concept 10.

15. The method of any preceding Concept 8 to 14 in which;

(a) A Wireless Device with a downloaded software module with no direct Internet connection transmits a beacon through a local area transceiver (Wi-Fi or BLUETOOTH), as a means to request for Internet access from a neighbouring Wireless Devices with a downloaded software module with direct Internet connection, meaning the one used local area transceiver is used in transmit mode until a Wireless Devices with a downloaded software module with direct Internet connection responds to this request for Internet access and then turn automatically bidirectional Send/Receive.

(b) Wireless Devices with a downloaded software module with direct Internet connection permanently scans through all its available local area transceiver (Wi-Fi and BLUETOOTH) for neighbouring Wireless Devices with a downloaded software module with no direct Internet connection, meaning all local area transceivers are in used in receive mode only until a Wireless Devices with a downloaded software module with no direct Internet connection that requests Internet access is detected and then turn automatically bidirectional Send/Receive.

(c) If the beacon received by the wireless device with a downloaded software module with direct Internet connection is through the same radio module as the one through which the wireless device receives direct Internet, then the software module of the wireless device with direct Internet access will cause the wireless device without direct Internet access to switch to another different radio module available to both wireless devices, or vice-versa such that the direct Internet access radio module is different than the radio module used towards the device without direct Internet access.

16. The wireless communication system of any preceding Concept 1 to 7 in which;

(a) A Wireless Device with a downloaded software module with no direct Internet connection transmits a beacon through a local area transceiver (Wi-Fi or BLUETOOTH), as a means to request for Internet access from a neighbouring Wireless Devices with a downloaded software module with direct Internet connection, meaning the one used local area transceiver is used in transmit mode until a Wireless Devices with a downloaded software module with direct Internet connection responds to this request for Internet access and then turn automatically bidirectional Send/Receive.

(b) Wireless Devices with a downloaded software module with direct Internet connection permanently scans through all its available local area transceiver (Wi-Fi and BLUETOOTH) for neighbouring Wireless Devices with a downloaded software module with no direct Internet connection, meaning all local area transceivers are in used in receive mode only until a Wireless Devices with a downloaded software module with no direct Internet connection that requests Internet access is detected and then turn automatically bidirectional Send/Receive.

(c) If the beacon received by the wireless device with a downloaded software module with direct Internet connection is through the same radio module as the one through which the wireless device receives direct Internet, then the software module of the wireless device with direct Internet access will cause the wireless device without direct Internet access to switch to another different radio module available to both wireless devices, or vice-versa such that the direct Internet access radio module is different than the radio module used towards the device without direct Internet access.

Many modifications and variations or different embodiments of this present invention are possible in view of the above disclosures, figures, drawings and explanations. Thus, it is to be understood that, within the scope of the appended claims, the invention can be practiced other than as specifically described above. The invention which is intended to be protected should not, however, be construed as limited to the particular forms disclosed, or implementation examples outlined, as these are to be regarded as illustrative rather than restrictive. Variations and changes could be made by those skilled in the art without deviating from the novelty of the invention. Accordingly, the foregoing detailed descriptions and figures should be considered exemplary in nature and not limited to the novelties of the invention as set forth in the claims.

The invention claimed is:

1. A system including a first internet enabled wireless mobile device and at least a second internet enabled wireless mobile device, the first internet enabled wireless mobile device including at least two radio transceivers of which at least one transceiver is a first local area wireless transceiver, and at least one transceiver is a first cellular phone network transceiver, the first internet enabled wireless mobile device further including a first non-transitory storage medium, and a first computer program product embodied on the first non-transitory storage medium, wherein the first computer program product is executable on the first internet enabled wireless mobile device to communicate with a second computer program product when executing on the second internet enabled wireless mobile device, the second internet enabled wireless mobile device including a second non-transitory storage medium, the second computer program product embodied on the second non-transitory storage medium, the second internet enabled wireless mobile device further including at least two radio transceivers of which at least one transceiver is a second local area wireless transceiver and at least one transceiver is a second cellular phone network transceiver, the communication using the first local area wireless transceiver in communication with the second local area wireless transceiver, wherein the first computer program product is executable on the first internet enabled wireless mobile device to operate said communication, in cooperation with the second computer program product when executing on the second internet enabled wireless mobile device, automatically, upon download of the first computer program product to the first internet enabled wireless mobile device, and upon download of the second computer program product to the second internet enabled wireless mobile device, and wherein in the event the first internet enabled wireless mobile device has a direct internet data connection and the second internet enabled wireless mobile device has no direct internet data connection, the second computer program product is executable on the second internet enabled wireless mobile device to communicate with the first enabled wireless mobile device using the second local area wireless transceiver, the first local area wireless transceiver, and the first computer program product when executing on the first internet enabled wireless mobile device, and the first computer program product is executable on the first internet enabled wireless mobile device to provide automatically an internet data connection via the communication to the second internet enabled wireless mobile device, using the first local area wireless transceiver, the second local area wireless transceiver, and the second computer program product when executing on the second internet enabled wireless mobile device, establishing automatically a bidirectional internet data connection via the communication and further wherein, in the event the second internet enabled wireless mobile device has a direct internet data connection and the first internet enabled wireless mobile device has no direct internet data connection, the first computer program product is executable on the first internet enabled wireless mobile device to communicate with the second internet enabled wireless mobile device, using the first local area wireless transceiver, the second local area wireless transceiver, and the second computer program product when executing on the second internet enabled wireless mobile device, and the second computer program product is executable on the second internet enabled wireless mobile device to provide automatically an internet data connection via the communication to the first internet enabled wireless mobile device, using the second local area wireless transceiver, the first local area wireless transceiver, and the first computer program product when executing on the first internet enabled wireless mobile device, establishing automatically a bidirectional internet data connection via the communication.

2. The system of claim 1, wherein the first internet enabled wireless mobile device is a mobile phone, a smartphone, or a tablet computer.

3. The system of claim 1, wherein the first internet enabled wireless mobile device and the second internet enabled wireless mobile device are a mobile phone, a smartphone, or a tablet computer.

4. The system of claim 1, wherein the communication does not require use of a virtual private network.

5. The system of claim 1, wherein the first local area wireless transceiver and the second local area wireless transceiver are both Wi-Fi or are both narrow band low energy transceivers.

6. The system of claim 1, wherein the first computer program product is executable on the first internet enabled wireless mobile device to access functions of the first internet enabled wireless mobile device.

7. The system of claim 1, wherein the second computer program product is executable on the second internet enabled wireless mobile device to access functions of the second internet enabled wireless mobile device.

8. The system of claim 1, wherein the computer program product when executing on the internet enabled wireless mobile device with direct internet access uses the cellular phone network transceiver or the local area network wireless transceiver of the internet enabled wireless mobile device with direct internet access to provide the internet data connection to the internet enabled wireless mobile device with no direct internet access, via the communication, when the internet enabled wireless mobile device without direct internet access is not using its cellular phone network transceiver nor its local area wireless transceiver for internet data communication.

9. The system of claim 1, wherein the first internet enabled wireless mobile device is configured to download the first computer program product using the transceiver connected to the internet, through the first local area wireless transceiver or through the first cellular phone network transceiver and, wherein the second internet enabled wireless mobile device is configured to download the second computer program product using the transceiver connected to the internet, through the second local area wireless transceiver or through the second cellular phone network transceiver.

10. The system of claim 1, wherein the computer program product executable on the internet enabled wireless mobile device that has no direct Internet connection will cause a beacon to be transmitted through the local area transceiver of the internet enabled wireless mobile device that has no direct Internet connection, to request for internet access from the computer program product executable on the internet enabled wireless mobile device that has direct Internet connection, via the communication.

11. A first internet enabled wireless mobile device forming part of a system including the first internet enabled wireless mobile device and at least a second internet enabled wireless mobile device, the first internet enabled wireless mobile device including at least two radio transceivers of which at least one transceiver is a first local area wireless transceiver, and at least one transceiver is a first cellular phone network transceiver, the first internet enabled wireless mobile device further including a first non-transitory storage medium, and a first computer program product embodied on the first non-transitory storage medium, wherein the first computer program product is executable on the first internet enabled wireless mobile device to communicate with a second computer program product when executing on the second internet enabled wireless mobile device, the second internet enabled wireless mobile device including a second non-transitory storage medium, the second computer program product embodied on the second non-transitory storage medium, the second internet enabled wireless mobile device further including at least two radio transceivers of which at least one transceiver is a second local area wireless transceiver and at least one transceiver is a second cellular phone network transceiver, the communication using the first local area wireless transceiver in communication with the second local area wireless transceiver, wherein the first computer program product is executable on the first internet enabled wireless mobile device to operate said communication, in cooperation with the second computer program product when executing on the second internet enabled wireless mobile device, automatically, upon download of the first computer program product to the first internet enabled wireless mobile device, and upon download of the second computer program product to the second internet enabled wireless mobile device, and wherein in the event the first internet enabled wireless mobile device has a direct internet data connection and the second internet enabled wireless mobile device has no direct internet data connection and the second computer program product is executable on the second internet enabled wireless mobile device to communicate with the first internet enabled wireless mobile device, using the second local area wireless transceiver, the first local area wireless transceiver, and the first computer program product when executing on the first internet enabled wireless mobile device, and the first computer program product is executable on the first internet enabled wireless mobile device to provide automatically an internet data connection via the communication to the second internet enabled wireless mobile device, using the first local area wireless transceiver, the second local area wireless transceiver, and the second computer program product when executing on the second internet enabled wireless mobile device, establishing automatically a bidirectional internet data connection via the communication, and further wherein, in the event the second internet enabled wireless mobile device has a direct internet data connection and the first internet enabled wireless mobile device has no direct internet data connection, the first computer program product is executable on the first internet enabled wireless mobile device to communicate with the second internet enabled wireless mobile device, using the first local area wireless transceiver, the second local area wireless transceiver, and the second computer program product when executing on the second internet enabled wireless mobile device, and the second computer program product is executable on the second internet enabled wireless mobile device to provide automatically an internet data connection via the communication to the first internet enabled wireless mobile device, using the second local area wireless transceiver, the first local area wireless transceiver, and the first computer program product when executing on the first internet enabled wireless mobile device, establishing automatically a bidirectional internet data connection via the communication.

12. The first internet enabled wireless mobile device of claim 11, wherein the first internet enabled wireless mobile device is a mobile phone, a smartphone, or a tablet computer.

13. The first internet enabled wireless mobile device of claim 11, wherein the communication does not require use of a virtual private network.

14. The first internet enabled wireless mobile device of claim 11, wherein the first local area wireless transceiver and the second local area wireless transceiver are both Wi-Fi or are both narrow band low energy transceivers.

15. The first internet enabled wireless mobile device of claim 11, wherein the first computer program product is executable on the first internet enabled wireless mobile device and the second computer program product is executable on the second internet enabled wireless mobile device, to access functions of the first internet enabled wireless mobile device and the second internet enabled wireless mobile device respectively.

16. The first internet enabled wireless mobile device of claim 11, wherein the first internet enabled wireless mobile device and the second internet enabled wireless mobile device, is configured to download the first computer program product and the second computer program product using the first local area wireless transceiver and the second local area wireless transceiver respectively.

17. The first internet enabled wireless mobile device of claim 11, wherein the computer program product executable on the internet enabled wireless mobile device that has no direct Internet connection will cause a beacon to be transmitted through the local area transceiver of the internet enabled wireless mobile device that has no direct Internet connection, to request for internet access from the computer program product executable on the internet enabled wireless mobile device that has direct Internet connection, via the communication.

18. A computer program product embodied on a non-transitory storage medium, the computer program product executable on a first internet enabled wireless mobile device and the computer program product executable on at least a second internet enabled wireless mobile device, the first internet enabled wireless mobile device including at least two radio transceivers of which at least one transceiver is a first local area wireless transceiver, and at least one transceiver is a first cellular phone network transceiver, the computer program product executable on the first internet enabled wireless mobile device to communicate with the computer program product when executing on the second internet enabled wireless mobile device, the second internet enabled wireless mobile device including at least two radio transceivers of which at least one transceiver is a second local area wireless transceiver and at least one transceiver is a second cellular phone network transceiver, the communication using the first local area wireless transceiver in communication with the second local area wireless transceiver, wherein the computer program product is executable on the first internet enabled wireless mobile device to operate said communication, in cooperation with the computer program product when executing on the second internet enabled wireless mobile device, automatically, upon download of the computer program product to the first internet enabled wireless mobile device, and upon download of the computer program product to the second internet enabled wireless mobile device, and wherein in the event the first internet enabled wireless mobile device has a direct internet data connection and the second internet enabled wireless mobile device has no direct internet data connection, the computer program product is executable on the second internet enabled wireless mobile device to communicate with the first internet enabled wireless mobile device, using the second local area wireless transceiver, the first local area wireless transceiver, and the computer program product when executing on the first internet enabled wireless mobile device, and the computer program product is executable on the first internet enabled wireless mobile device to provide automatically an internet data connection via the communication to the second internet enabled wireless mobile device, using the first local area wireless transceiver, the second local area wireless transceiver, and the computer program product when executing on the second internet enabled wireless mobile device, establishing automatically a bidirectional internet data connection via the communication, and further wherein, in the event the second internet enabled wireless mobile device has a direct internet data connection and the first internet enabled wireless mobile device has no direct internet data connection, the computer program product is executable on the first internet enabled wireless mobile device to communicate with the second internet enabled wireless mobile device, using the first local area wireless transceiver, the second local area wireless transceiver, and the computer program product when executing on the second internet enabled wireless mobile device, and the computer program product is executable on the second internet enabled wireless mobile device to provide automatically an internet data connection via the communication to the first internet enabled wireless mobile device, using the second local area wireless transceiver, the first local area wireless transceiver, and the computer program product when executing on the first internet enabled wireless mobile device, establishing automatically a bidirectional internet data connection via the communication, and wherein only the computer program product executable on the internet enabled wireless mobile device that has no direct Internet connection will cause a beacon to be transmitted through the local area transceiver of the internet enabled wireless mobile device that has no direct Internet connection, to request for internet access from the computer program product executable on the internet enabled wireless mobile device that has direct Internet connection, via the communication, and wherein the communication does not require use of a virtual private network.

19. The computer program product of claim 18, wherein the computer program product is executable on the first internet enabled wireless mobile device to access functions of the first internet enabled wireless mobile device, and the computer program product is executable on the second internet enabled wireless mobile device to access functions of the second internet enabled wireless mobile device.

20. The computer program product of claim 18, wherein the computer program product when executing on the internet enabled wireless mobile device with direct internet access uses the cellular phone network transceiver or the local area network wireless transceiver of the internet enabled wireless mobile device with direct internet access to provide the internet data connection to the internet enabled wireless mobile device without direct internet connection access, via the communication, when the internet enabled wireless mobile device without direct internet connection access is not using its cellular phone network transceiver nor its local area wireless transceiver for internet data communication.

* * * * *